(12) United States Patent
Nomura et al.

(10) Patent No.: US 7,515,288 B2
(45) Date of Patent: Apr. 7, 2009

(54) IMAGE PROCESSING APPARATUS

(75) Inventors: Tatsuo Nomura, Soraku-gun (JP); Kohki Fukuda, Nara (JP); Keiichi Hasegawa, Soraku-gun (JP); Syoichiro Yoshiura, Ikoma-gun (JP); Yuji Okamoto, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 1520 days.

(21) Appl. No.: 10/037,940

(22) Filed: Jan. 4, 2002

(65) Prior Publication Data

US 2002/0145770 A1   Oct. 10, 2002

(30) Foreign Application Priority Data

Apr. 6, 2001 (JP) .............................. 2001-109200
May 11, 2001 (JP) .............................. 2001-142392

(51) Int. Cl.
   G06F 3/12    (2006.01)
(52) U.S. Cl. ................... 358/1.15; 358/1.13; 358/1.1; 358/1.6; 358/401; 358/403; 358/474; 395/195
(58) Field of Classification Search ................ 358/1.15, 358/442, 403, 401, 1.13, 1.1, 1.6, 474; 399/8; 370/466; 705/400; 702/186; 395/114, 195
See application file for complete search history.

(56) References Cited

U.S. PATENT DOCUMENTS 5,699,494 A * 12/1997 Colbert et al. ............. 358/1.15
5,767,845 A * 6/1998 Oashi et al. ............... 715/500.1
5,956,160 A * 9/1999 Watanabe ................... 358/496
6,453,127 B2 * 9/2002 Wood et al. .................... 399/8
6,529,522 B1 * 3/2003 Ito et al. ...................... 370/466
6,738,154 B1 * 5/2004 Venable ..................... 358/1.15
7,039,558 B2 * 5/2006 Isshiki ......................... 702/186
7,173,724 B2 * 2/2007 Nomura et al. ............ 358/1.15
2002/0107817 A1 * 8/2002 Nakajima .................... 705/400

FOREIGN PATENT DOCUMENTS

JP        8-297388        11/1996
JP      2000232541      *  8/2000

OTHER PUBLICATIONS

U.S. Appl. No. 10/035,112, filed Dec. 20, 2001, USSN: Nomura, et al.

* cited by examiner

Primary Examiner—Twyler L. Haskins
Assistant Examiner—Michael Burleson
(74) Attorney, Agent, or Firm—Edwards Angell Palmer & Dodge LLP; David G. Conlin; Peter J. Manus

(57) ABSTRACT

A digital copying machine as an example of the image processing apparatus is provided with a scanner unit and a printer unit is arranged such that a display state of a printer-side display panel of a printer-side user interface section changes its display state in response to a command entered by a scanner-side user interface. As a result, an image processing apparatus provided with a plurality of user interface sections of desirable operability can be realized.

21 Claims, 29 Drawing Sheets

FIG. 7
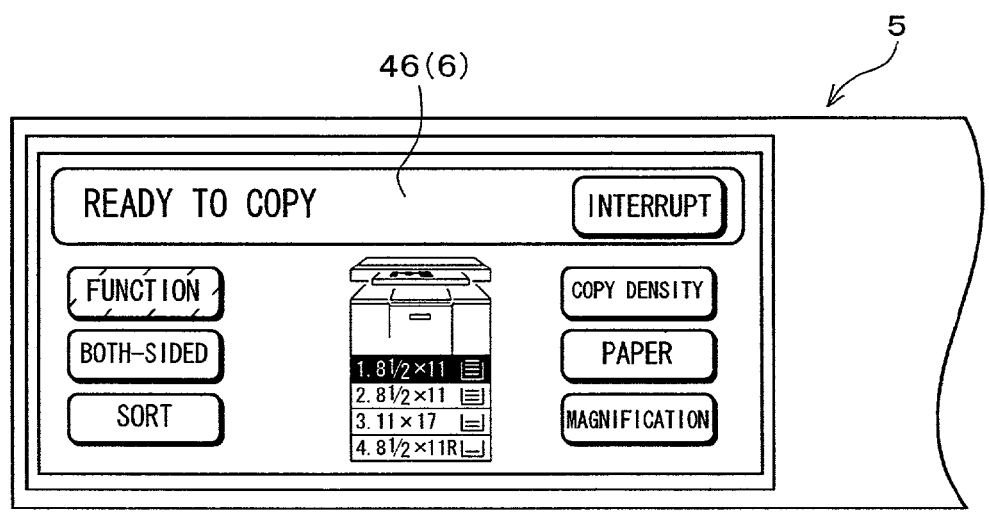
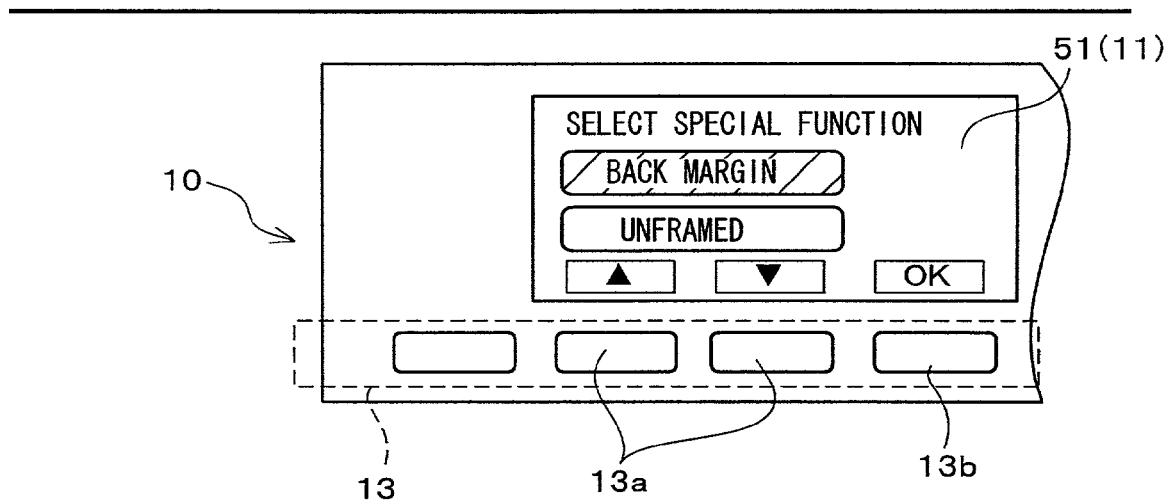

FIG. 8
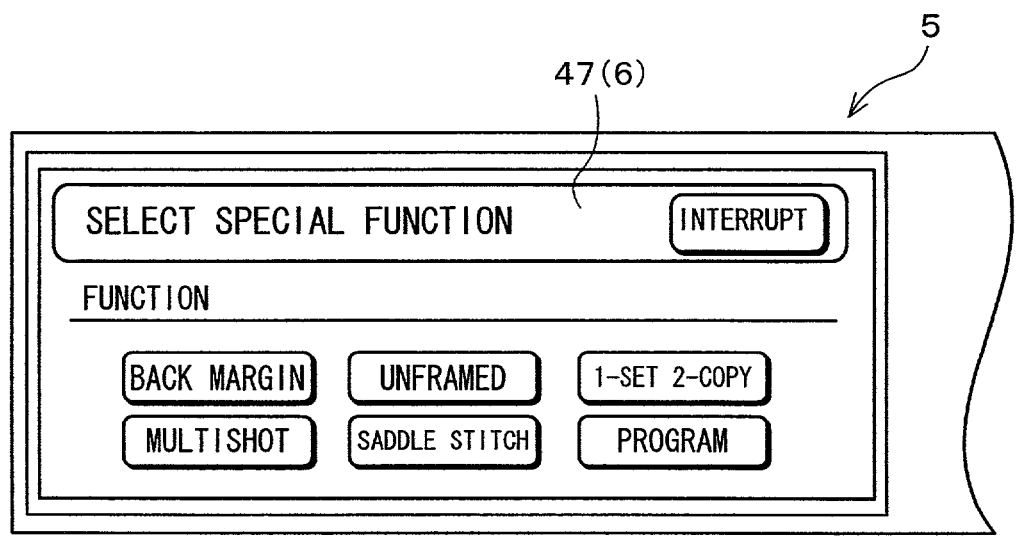
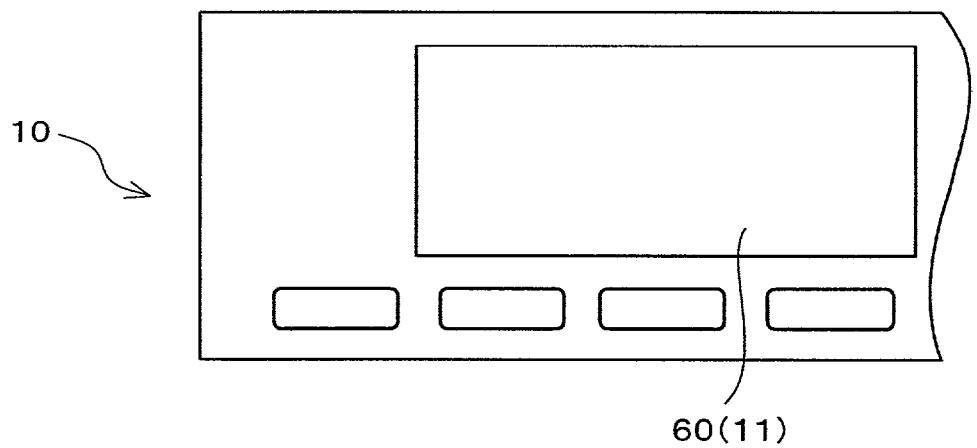

FIG. 9
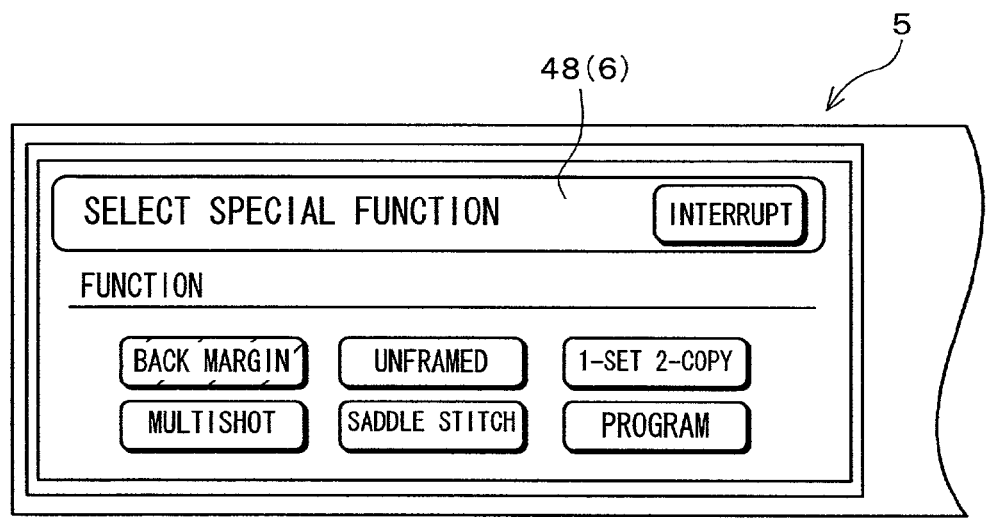
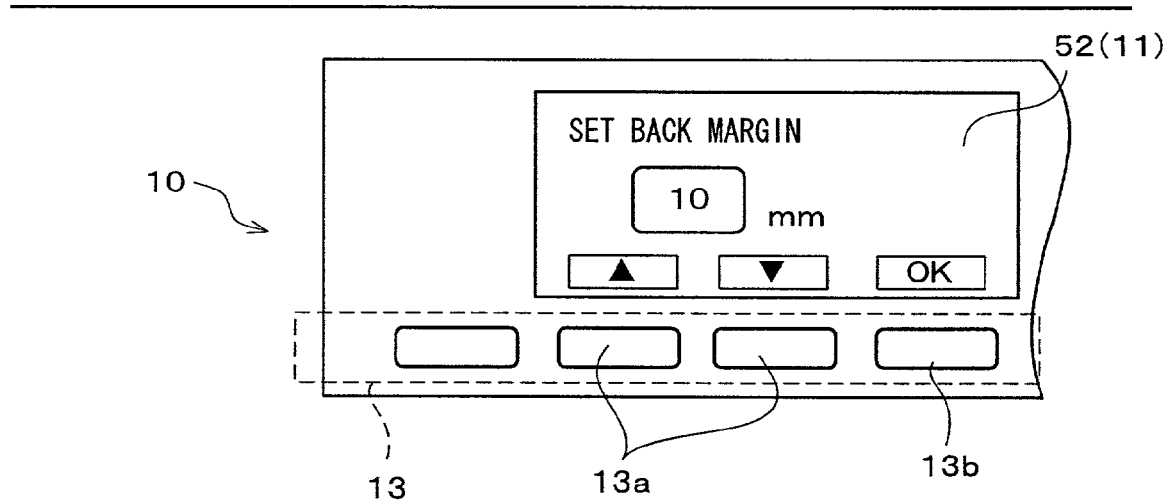

FIG. 15

| | USER NAME/ MODE NAME | DATE/TIME OF RECEIPT | PAGE NUMBER | STATUS |
|---|---|---|---|---|
| 1 | OKAMOTO | 14:15 12/09 | 007/015 | IN PROGRESS |
| 2 | MATUMOTO | 14:17 12/09 | 000/007 | ON STANDBY |
| 3 | 0743XXXXX | 14:18 12/09 | 000/003 | ON STANDBY |

JOB QUEUE / COMPLETE

1/2

PRINT JOB | E-MAIL JOB | FAX JOB | ALL JOBS | INTERRUPT

PAPER JAM OCCURRED IN MAIN BODY.
MOVE BOTH-SIDED UNIT.

201

HIGH CAPACITY TRAY IS OUT OF PAPER.
SUPPLY PAPER.

PRESENT TIME
14:15  12/09

PRESENT TIME
14:15 12/09

PRINTING
OKAMOTO MS-WORD

| SCANNER FUNCTION IS IN FAILURE. |
|---|

201

| SCANNER FUNCTION IS IN FAILURE. |
|---|

201

| PRINTING<br>OKAMOTO MS-WORD |
|---|

201

IMAGE PROCESSING APPARATUS

FIELD OF THE INVENTION

The present invention relates to an image processing apparatus provided with a plurality of user interface sections, which permits a selective use of the user interface sections for entering commands to execute a processing as desired and conforming a state of the processing, etc., examples of such image processing apparatus including a digital copying machine wherein an unit of an image input section (scanner section) and an unit of an image output section (printer section) are connected via an interface.

BACKGROUND OF THE INVENTION

Conventionally, in an image processing apparatus wherein a scanner unit and a printer unit are provided as separate members at a predetermined positional relationship, the scanner unit and the printer unit respectively provided with user interface sections are typically adopted. These user interface sections are used in displaying a variety of information, or entering commands to execute processing.

In the foregoing image processing apparatus provided with two user interface sections, either one of these user interface sections, which the user finds more convenient to use in its visibility and operability is mainly used. For example, in the typical structure of the image processing apparatus wherein the scanner unit and the printer unit are combined, the scanner unit is provided above the printer unit, for convenience in setting an original document or replacing the original document currently set with another original document. In this typical structure, the mainly used user interface section would be the user interface section of the scanner unit. Therefore, the user interface section of the scanner unit is conveniently situated for the user (in an upper part of the image forming apparatus). This interface section of the scanner unit would therefore be mainly used.

As an example of such conventional image processing apparatus, Japanese Unexamined Patent Publication No. 8-297388/1996 (Tokukaihei 8-297388, published on Nov. 12, 1996) discloses an image processing apparatus wherein display means of the scanner unit displays information on both a scanner unit and a printer unit, while display means of the printer unit displays information on only the printer unit.

Japanese Unexamined Patent Publication No. 6-253084/1994 (Tokukaihei 6-253084, published on Sep. 9, 1994) discloses a composite machine terminal equipment provided with a variety of functions such as a print function, a copy function, a facsimile function, etc., wherein when its functions are to be expanded, an operation panel provided as standard equipment and a detachably provided operation panel as an expansion display means are controlled so that both panels can cooperatively operate, to attain an improvement in economical aspect.

In the foregoing conventional examples, complicated information on the printer unit is displayed using the large size display section of the scanner unit or another detachably attached unit. However, the above conventional display structures has such problem that the user gets confused as it is unclear which of the plurality of display sections is to be seen. For example, in a combined use of the scanner unit and the printer unit, generally, the user sees both of the display sections of these units which are provided one above the other, and performs a necessary processing based on the information displayed in either one of the display sections, which the user finds more useful.

Namely, in the conventional image forming apparatuses of the above publications, when the user enters a command for executing a processing, or checks a status of the processing, etc., the user's eyes are caught by both the information in the scanner-side display means and the information displayed in the printer-side display section. It is therefore difficult for the user to check the displayed information and recognize the contents thereof, resulting in poor operability. Particularly, when the user, who is not used to the image forming apparatus, operates the apparatus, the foregoing problem of making the user confused by the different information respectively displayed in the plurality of display means, and in this case, the operability would be more significantly lowered.

Namely, in the image forming apparatus displayed in the above publication, information is displayed on the scanner-side display means and the printer-side display means, and therefore, it is likely that the operator gets confused, and for the user, the information displayed in the user interface is difficult to be recognized.

For example, in the structure wherein the scanner unit is provided above the printer unit, the user of the apparatus typically operates while observing the scanner-side display means. In this state, since the printer-side display means is hidden by the scanner unit, the user needs to crouch down to check the display on the printer-side display means.

Namely, in the conventional image forming apparatuses of the above publications, a large amount of information is typically displayed respectively in the plurality of display means which are provided at positions apart from other, which makes the operator difficult to recognize the contents of all the information. Namely, the image processing apparatus disclosed in the above publication has such a drawback in that the information displayed in the user interfaces are difficult for the operator to recognize, resulting in poor operability. Particularly, in the case where the scanner-side display means and the printer-side display means have mutually different display capacities or functions, the respective information would be displayed in different manner, and in this case, the problem of vexatious complication in recognizing the contents of the displayed information would become more serious.

SUMMARY OF THE INVENTION

It is therefore an object of the present invention to overcome the above and other drawbacks of the prior art and to provide an image processing apparatus of a desirable operability without a problem of vexatious complication, for example, even for a user who is not used to the image processing apparatus.

In order to achieve the above object, an image processing apparatus of the present invention is characterized by including:

an image processing section for carrying out a processing of image data; and a plurality of user interface sections for displaying information regarding the processing of image data and for entering commands on the processing of image data, wherein the plurality of user interface sections are arranged such that in response to a command entered by a specific user interface section, other user interface section(s) than the specific user interface section change(s) its (their) display state(s).

According to the above structure of the present invention, the image processing apparatus provided with a plurality of user interface sections, which offers an improved operability and which is user-friendly can be realized.

In the conventional structure of the image processing apparatus provided with a plurality of user interface sections, typically, plenty of information is always displayed respectively in the plurality of user interface sections, which are positioned apart from each other, and therefore, the user gets confused in checking the contents of the information displayed in respective display sections, resulting in poor operability.

In view of the foregoing problem associated with the conventional structure, the image processing apparatus of the present invention is arranged such that in response to a command entered by the specific user interface section, other user interface section(s) than the specific user interface section change(s) its (their) display state(s). According to this structure, for example, when the specific user interface is used in displaying information regarding the processing of image to be performed frequently and entering commands on that processing of image, other user interface section(s) than the specific user interface section can be set in non-display state. In this way, such problem that the user gets confused by the information displayed in other user interface section than the specific user interface section can be eliminated, and an improved operability of the image processing apparatus can therefore be achieved.

In the present invention, the display state indicates the state of the display in appearance visible by the user. Similarly, a change in display state indicates a change in the state of the display in appearance visible by the user, such as a change from a state of the user interface where some information is displayed to a state of the user interface where no information is displayed, or vice versa.

As described, the image processing apparatus of the present invention permits a selective use of the plurality of user interface sections according to the need. Therefore, even for multifunctional image processing apparatus, such problem of vexatious complication that a plenty of information is always displayed in the plurality of user interface sections, which makes the user confused, can be avoided, and an improved operability can therefore be ensured. As a result, the image processing apparatus of desirable operability without the problem making the user confused can be realized.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 7 is a typical depiction explaining a user interface upon selecting a specific function key with regard to a digital copying machine in accordance with the first example of the first embodiment of the present invention;

FIG. 8 is a typical depiction explaining the user interface upon selecting a specific function key with regard to a digital copying machine in accordance with the second example of the first embodiment of the present invention;

FIG. 9 is a typical depiction which explains the user interface upon selecting a specific function with regard to the digital copying machine in accordance with the second example of the first embodiment of the present invention;

FIG. 15 is an explanatory view illustrating a progress report screen of a job in the display section of the operation panel of the scanner unit of FIG. 11;

FIG. 20 is a view illustrating a display example of the display section indicative of a paper jam in a longitudinal transport path of the printer unit in an independent use of the printer unit;

FIG. 23 is a view illustrating a display example of a printer unit of another image forming apparatus in accordance with the second embodiment of the present invention;

FIG. 24(a) is a view illustrating a display example of the printer unit of another image forming apparatus in accordance with the second embodiment of the preset invention;

FIG. 24(b) is a view illustrating a display example where the display state is switched from the display of FIG. 24(a) by operating the operation section of the printer unit of another image forming apparatus in accordance with the second embodiment of the present invention;

DESCRIPTION OF THE EMBODIMENTS

First Embodiment

The following will explain a digital copying machine in accordance with one embodiment of the present invention with reference to FIG. 1 through FIG. 6 as one example application of an image processing apparatus of the present invention.

Figure 2:
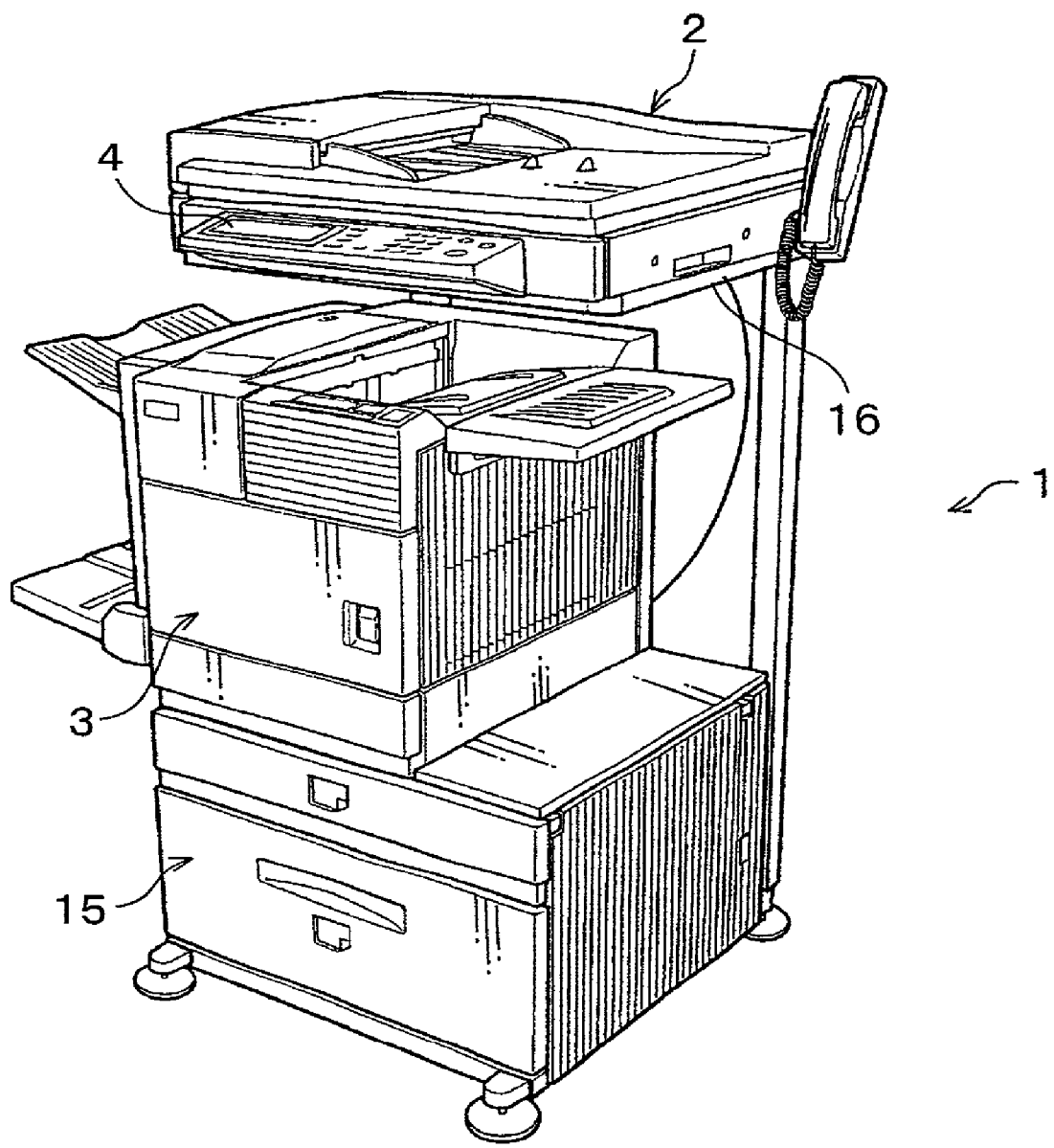
FIG. 2 is a perspective view illustrating the overall structure of the digital copying machine of FIG. 1.

As illustrated in FIG. 2, a digital copying machine (image processing apparatus) 1 in accordance with the present embodiment includes a scanner unit 2 which serves as an image processing unit, and a printer unit 3 which serves as another image processing unit. The scanner unit 2 is provided for obtaining an electronic image data by electronically reading a document image. The printer unit 3 is provided for forming an image on a recording material based on the electronic image data. The scanner unit 2 is provided with a scanner-side operation panel section 4 which is conveniently situated for the user.

The scanner unit 2 and the printer unit 3 are supported by a supporting member in such a manner that the scanner unit 2 is placed right above the printer unit 3. These scanner unit 2 and the printer unit 3 are provided at an appropriate interval in between so that an operator (user) can operate the printer unit 3 placed under the scanner unit 2 with ease.

Figure 3:
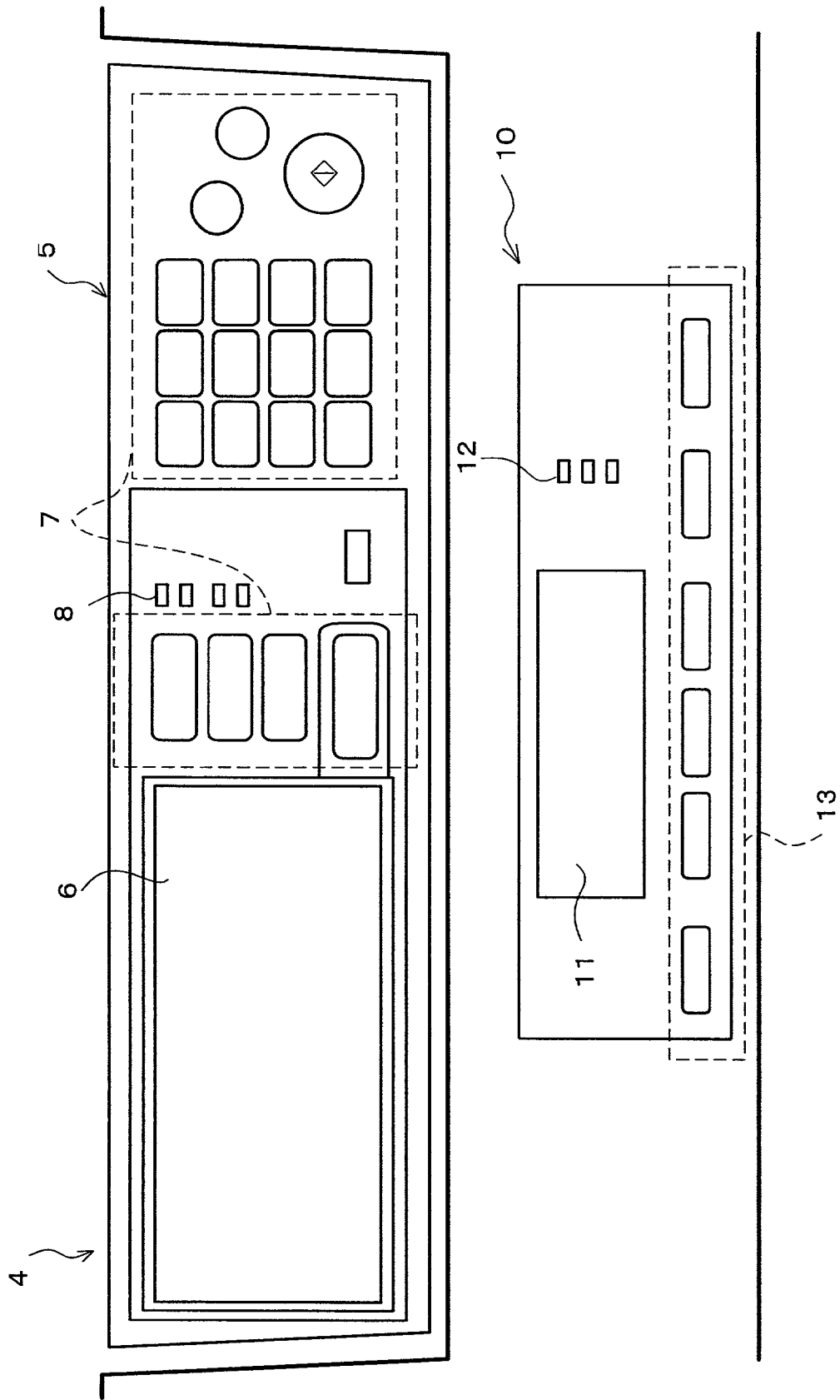
FIG. 3 is a plan view illustrating the structure of a scanner-side user interface and a printer-side user interface of the digital copying machine of FIG. 1.

The scanner-side operation panel 4 of the scanner unit 2 has a scanner-side user interface (user interface section) 5 formed thereon as shown in FIG. 3. This scanner-side user interface 5 is provided for mainly displaying information including operation guide or operation state, etc., of the scanner unit 2. This scanner-side user interface 5 includes a scanner-side display panel 6 serving as a touch panel display, a set of scanner-side operation keys 7, and a scanner-side LED display section 8.

The scanner-side display panel 6 is constituted by a dot-matrix display screen and a transparent tablet formed thereon. This scanner-side display panel 6 displays detailed information or a set of operation command keys. The user can enter commands to execute modes of various kinds with respect to the digital copying machine 1 (image processing apparatus (image processing system)) by depressing a tablet according to the displayed information. On the right side of the scanner-side display panel 6 shown in FIG. 3, provided is the set of scanner-side operation keys 7 for entering commands for other modes of various kinds with respect to the system, and the scanner-side LED display section 8 for displaying brief information on the state of the digital copying machine 1.

On the upper surface of the printer unit 3, provided is a printer-side user interface (user interface section) 10, for mainly displaying information regarding operation guides or an operating state, etc., of the printer unit 3. On the printer-side user interface 10, provided are a printer-side dot-matrix display panel 11 for displaying detailed information, and a printer-side LED display section 12 for displaying brief information. Further, provided in a vicinity of these members is a set of printer-side operation keys 13 for entering commands to execute the processing in modes of various kinds.

To the digital copying machine 1 having the foregoing arrangement, connected via a network is a plurality of external equipment, such as a personal computer, a telephone terminal equipment, etc., not shown. Then, the image data transmitted to the digital copying machine 1 from the external equipment via the interface, which is connected to the digital copying machine 1 via the network circuit, is once sent to an image processing section of the digital copying machine 1, to be subjected to a predetermined processing, and the image data are then reproduced as a recorded image on a recording material such as paper, etc., in an image recording section.

The printer unit 3, which constitutes the digital copying machine 1 of the foregoing structure, is independently operable. Namely, the printer unit 3 is capable of outputting the reproduced image from the image recording section by recording or reproducing the image data on a recording material based on the received image data from a plurality of external equipment such as personal computers, telephone terminal equipments, etc., connected via the network.

The operations of the digital copying machine 1 in accordance with the present embodiment and the display structure of the user interface will be explained.

In order to realize the digital copying machine 1 as shown in FIG. 2 wherein the scanner unit 2 and the printer unit 3 are combined, the printer unit 3 is provided on an upper surface of a high capacity feed unit 15, and the scanner unit 2 is set on a scanner support member 16 fixed to a part of the feed unit 15. Then, the scanner unit 2, the printer unit 3 and peripheral equipment (high capacity feed unit 15, etc.), is connected, respectively, using a cable, a connector, etc. As a result, an installation of the digital copying machine 1 is completed so as to be capable of controlling the entire digital copying machine 1 and supplying current to the entire digital copying machine 1, i.e., to respective sections which constitute the image processing apparatus.

In the foregoing structure, when the operator powers on a switch of the digital copying machine 1, a predetermined voltage is supplied to each processing unit from a power supply circuit, and an initial checking (self-diagnostic checking) is performed for checking the state of each processing section. The result of this initial checking is displayed at least in either one of the scanner-side user interface 5 and the printer-side user interface 10 (hereinafter simply referred to as a user interface if both are not necessarily be distinguished). If the result of this initial checking indicates that an abnormality is not detected in any of the processing sections, it is determined that the image processing apparatus, i.e., the digital copying machine 1 is operable. On the other hand, if the result of the initial checking indicates some abnormality occurs at least in one of the processing sections, it is determined that the image processing apparatus, i.e., the digital copying machine 1 is disabled.

As a result of this initial checking, if some abnormality is detected and a message indicative of the digital copying machine 1 being disabled is displayed, the user is expected to call for service personnel. On the other hand, as a result of this initial checking, if any abnormality is not detected, and it is determined that the digital copying machine 1 is operable as an image processing apparatus, the digital copying machine 1, wherein the scanner unit 2 and the printer unit 3 are combined, starts operating as the image processing apparatus. Namely, in the digital copying machine 1 of the foregoing structure, the processing of an image is executed as a system based on the contents of the command entered by the user interface while executing respective processing in the processing sections.

In the digital copying machine 1 in accordance with the present embodiment, upon confirming the connection of the scanner unit 2, the printer-side user interface 10 is set ineffective, and only the scanner-side user interface 5 is used in displaying information on the entire digital copying machine 1 or entering commands for all the processing to be executed in the digital copying machine 1. As a result, the problem of poor operability associated with the structure wherein the scanner-side user interface 5 and the printer-side user interface 10 respectively display information and enter commands can be prevented.

Namely, according to the foregoing digital copying machine 1 of the present embodiment, the scanner-side user interface 5 is used in displaying all the information and entering all the commands for the entire digital copying machine 1. It is therefore possible for the user to recognize the displayed information and the operator guidance with ease, and an improved operability can be ensured. Namely, the digital copying machine 1 of desirable operability without the problem of making the user confused can be realized.

Figure 4:
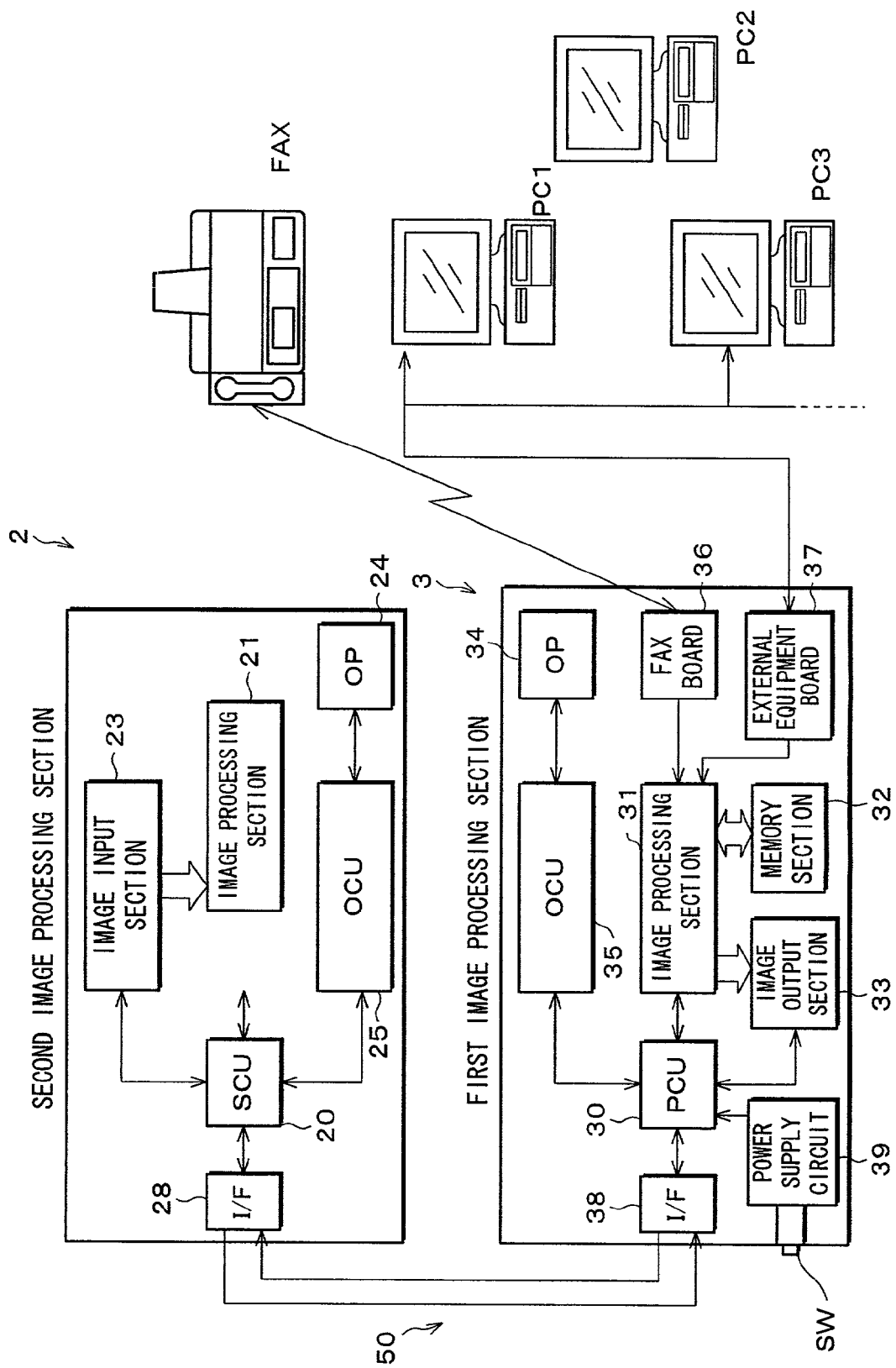
FIG. 4 is a block diagram illustrating the schematic structure of the digital copying machine of FIG. 1.

Next, the schematic structures of the printer unit 3 and the scanner unit 2 of the digital copying machine 1 will be explained in reference to the block diagram of FIG. 4 wherein each processing section is shown in a block.

Firstly, the schematic structure of the printer unit 3 will be explained. The printer unit 3 includes a process control unit (PCU) 30, a printer-side image processing section 31, a memory section 32, an image output section 33, a printer-side operation panel (OP) 34, a printer-side operation panel control unit (OCU) 35, a FAX board 36, an external equipment board 37, a printer-side interface (I/F) 38 and a power supply circuit 39.

The process control unit 30 is provided for controlling the printer unit 3 as a whole. The printer-side image processing section 31 is provided for processing image data. The memory section 32 is provided for temporarily storing image data and various control data to be processed in the printer-side image processing section 31. The image output section 33 is provided for outputting an image based on the image data as processed in the image processing section 31.

The printer-side operation panel 34 is used in displaying variety of information on the printer unit 3, or entering commands by the user. This printer-side operation panel 34 is controlled by the printer-side operation panel control unit 35. The fax board 36 permits a facsimile communication with the external communication apparatus via the communication line. The external apparatus board 37 receives data from the host computer via the network line, and prints out the data as received. The printer-side interface 38 is provided for connecting the printer unit 3 and the scanner unit 2. The power supply circuit 39 is provided for supplying power to each of the processing sections of the digital copying machine 1 upon a switch (SW) is powered on.

Next, the schematic structure of the scanner unit 2 will be explained. The scanner unit 2 includes a scanner control unit (SCU) 20, a scanner-side image processing section 21, a scanner-side image input section 23, a scanner-side operation panel (OP) 24, a scanner-side operation panel control unit (OCU) 25 and a scanner-side interface (I/F) 28.

The scanner control unit 20 is provided for controlling the scanner unit 2 as a whole, and the scanner-side image processing section 21 is provided for performing a predetermined process on the image data. The image input section 23 inputs image data of a original document in the scanner unit 2 as image data (electronic image data). The scanner-side operation panel 24 is used in displaying a variety of information on the scanner unit 2 or entering commands by the user. This scanner-side operation panel 24 is controlled by the scanner-side operation panel control unit 25. The scanner-side interface 28 is provided for connecting the scanner unit 2 and the printer unit 3.

The scanner unit 2 and the printer unit 3 are connected by a connection cable 50 via the scanner-side interface 28 and the printer-side interface 38. By connecting the scanner unit 2 and the printer unit 3, power can be supplied across the units, and control signals of various kinds and the image data can be transferred to each other with ease. Here, for the connection cable, by adopting the one in which various functions are incorporated, the scanner unit 2 and the printer unit 3 can be connected with ease.

Figure 5:
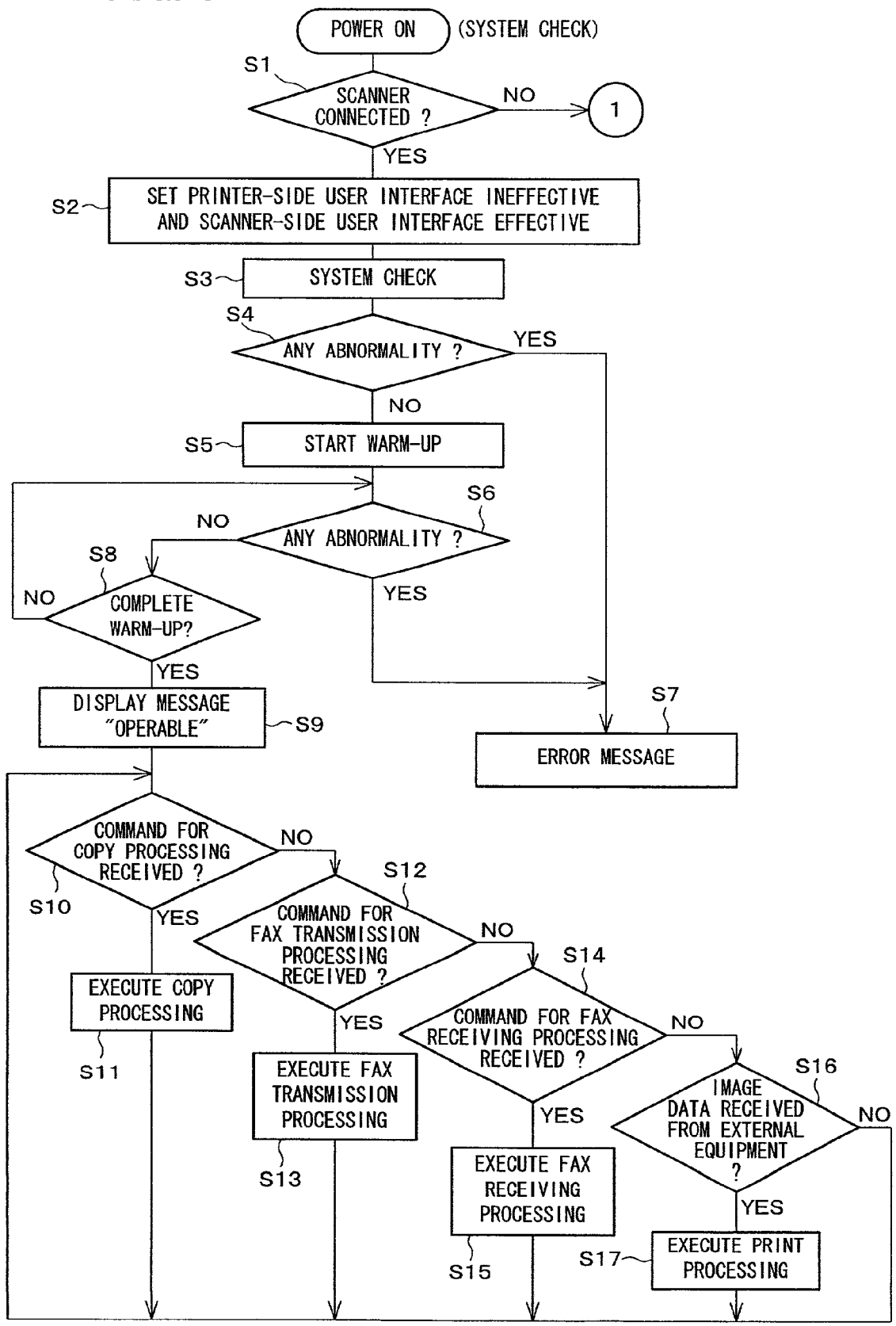
FIG. 5 is a flowchart which explains the processes till the digital copying machine of FIG. 1 starts operating.

Next, the processes for setting the digital copying machine 1 ready to operate, i.e., for setting the digital copying machine 1 wherein the scanner unit 2 and the printer unit 3 are combined to be operable as the image processing unit will be explained referring to the flowchart of FIG. 5.

When turning ON a power switch (SW) of the power circuit 39, predetermined power is supplied to respective processing sections of the scanner unit 2 and the printer unit 3, and in the meantime, the digital copying machine 1 (image processing apparatus) is subjected to checking.

When checking the digital copying machine 1, first, it is confirmed if the scanner unit 2 is connected to the printer-side interface 38 by the process control unit 30 of the printer unit 3 (S1). In this example, the scanner unit 2 is connected to the printer-side interface 38, and thus the digital copying machine 1 is recognized in S1 as the image processing apparatus wherein the scanner unit 2 and the printer unit 3 are combined. Then, the printer-side user interface 10 of the printer unit 3 is set ineffective, and only the scanner-side user interface 5 of the scanner unit 2 is set effective (S2). Then, the digital copying machine 1 is subjected to further checking.

The process control unit 30 of the printer unit 3 and the scanner control unit 20 of the scanner unit 2 perform system checking respectively by checking respective processing sections to determine if the digital copying machine 1 as a whole is operable as a image processing apparatus (S3). In this system checking, if an abnormality is not detected in either of the scanner unit 2 and the printer unit 3, and the digital copying machine 1 is confirmed to be operable as an image processing apparatus (S4), the scanner unit 2 and the printer unit 3 start being warmed up respectively to be ready to execute the processing of image data (S5). On the other hand, if an occurrence of some informality is recognized in the system, even in a part of the system (S4), the digital copying machine 1 as a whole is determined to be disabled as the image processing apparatus. In this case, an error message is displayed in the scanner-side user interface 5, to inform the user of the system as a whole is disabled (S7).

Next, it is checked if any abnormality is detected in any part of the digital copying machine 1 while a warm-up process is being performed by the scanner unit 2 and the printer unit 3 after the warm-up process is started, i.e., after respective processing sections of the scanner unit 2 and the printer unit 3 start operating (S6). In this case also, if any abnormality is detected, the user is informed by the scanner-side user interface 5 of that the digital copying machine 1 as a whole is disabled as a system (S7). On the other hand, if the warm-up process is completed without any problem (S8), the user is informed of that the digital copying machine 1 is operable.

Then, upon receiving a command to execute a copy processing from the scanner-side user interface 5 on standby (S10), based on the image data of original document, as read out by the scanner unit 2, a copy processing is executed by the printer unit 3 according to the contents of the command (S11). Then, upon receiving the command to execute a FAX transmission processing from the scanner-side user interface 5 (S12), the image data of original document as read out by the scanner unit 2 is transferred to the FAX board 36 of the printer unit 3, and after subjecting the image data as received to the compression process in accordance with a communication device of the transmitting end, and confirming the size, the image data is subjected to a predetermined processing, thereby performing the fax transmission processing with respect to the communication device of the transmitting end (S13).

Further, upon receiving a fax image from an external communication device via a communication line (S14), a message indicative of a receipt of the fax image, and a message indicating that the image as received is output from the printer unit 3 are displayed in the scanner-side user interface 5. Then, a fax receiving process is performed by restoring the received image on the FAX board 36 of the printer unit 3, and printing out the resulting image from the image output section 33 after a predetermined process is performed in the printer-side image processing unit 31 (S15).

As in the foregoing fax receiving process, upon receiving the image data from the side of the host computer connected via the network line, i.e., from the external equipment (S16), a message indicating that the image data is received from the external equipment, and a message indicating that the received image is output from the external equipment on the scanner-side user interface 5 are displayed. Then, the image received from the external equipment in the external apparatus board 37 of the printer unit 3 is developed, and in the printer-side image processing section 31, an external receiving process (printing process) is performed for printing out from the image output section 33 after applying a predetermined process in the printer-side image processing section 31 (S17).

The foregoing explanations have been given through the case where the digital copying machine 1 is operated under such condition where the printer unit 3 is connected to the scanner unit 2.

In the following, explanations will be given through the case where the scanner unit 2 is detached from the printer unit 3 for repairing, checking, or changes in network environment of the scanner unit 2.

In the case where the scanner unit 2 is detached from the system structure of the digital copying machine 1, i.e., in the case of taking out the connection cable 50 for connecting the scanner unit 2 and the printer unit 3, the connection cable 50 is detached after once turning off the power of the digital copying machine 1. Then, after taking out the connection cable 50, the power switch is turned ON again. In this state, a predetermined power is supplied to each processing section, and in the meantime, a checking of the system is performed.

Figure 6:
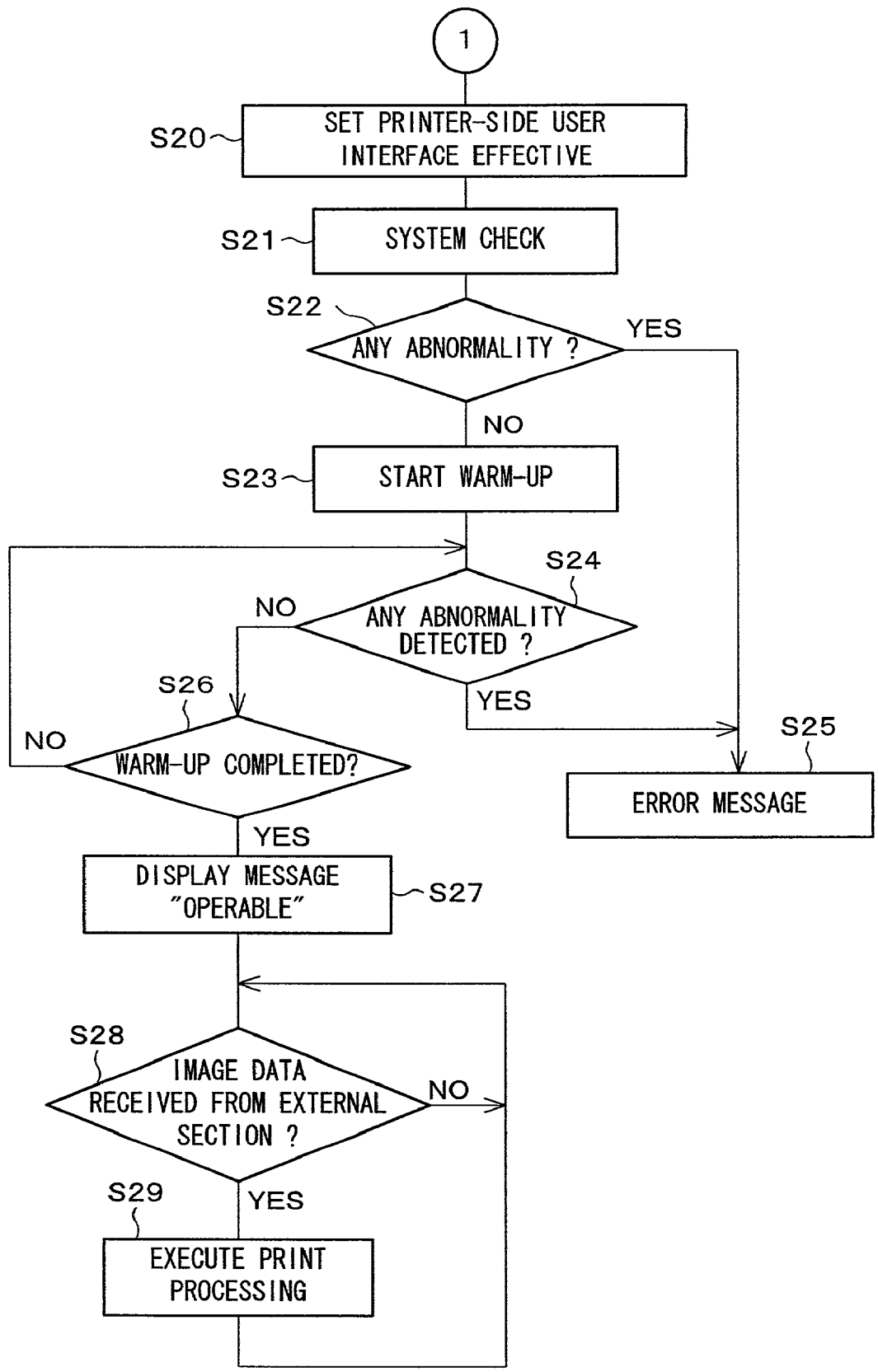
FIG. 6 is a flowchart which explains the processes till the digital copying machine of FIG. 1 from which a scanner unit is detached starts operating as a network computer.

In the system checking, first, it is confirmed if the scanner unit 2 is connected to the printer-side interface 38 (S1) by the process control unit 30 of the printer unit 3. Here, because the scanner unit 2 is not connected, it is recognized as a network printer constituted by an independently operable printer unit 3. As illustrated in the flowchart of FIG. 6, the printer-side user interface 10 is set effective (S20), and the system is subjected to further checking.

Then, in the printer unit 3, the process control unit 30 checks various processing sections, and it is confirmed if the digital copying machine 1 as a whole is capable of performing an image processing operation (S21). Then, in the system checking, if it is confirmed that any abnormality has occurred in the printer unit 3, and the system is capable of performing an image processing operation (S22), the printer unit 3 starts being warmed up to be ready to execute the processing of image data (S23). In the system checking of S21, if some abnormality is detected even in a part of the network printer system constituted by the independently operable printer unit 3 (S22), an error message is displayed in the printer-side user interface 10, so as to inform the user of that the system is disabled (S2.5).

Next, it is checked if some abnormality is detected in a part of the printer unit 3 (S23) while a warm-up process is being performed after starting the warming up process of the printer unit 3, i.e., after the respective processing sections of the printer unit 3 start operating (S24), a message indicative of that a system is disabled is displayed in the printer-side interface 10 to inform the user of that the printer unit 3 is disabled (S25). On the other hand, in the case where the warm-up process is completed without any problem (S26), a message indicative of that the printer unit 3 is operable is displayed in the printer-side user interface 10 (S27) to inform the user of that the printer unit 3 is operable as a network printer.

Then, upon receiving the image data from the side of a host computer connected via the network line on standby, i.e., upon receiving the image data from an external equipment (S28), a message indicating that the image data is received from the external equipment and a message indicative of that the received image is output from the printer unit 3 are displayed in the printer-side interface 10. Then, the processing of the image data received from the external equipment (print processing) is executed by developing the received image on the external equipment board 37 of the printer unit 3, and printing out the received image from the image output section after having gone through a predetermined processing (S29).

In the foregoing, explanations have been given through the case wherein as the image processing apparatus, a digital copying machine is prepared beforehand by connecting the scanner unit 2 and the printer unit 3 via the connection cable 50, and then, the scanner unit 2 is detached from the digital copying machine 1 for repairing, checking, etc. However, the above explanations can be applied also to the case wherein the network printer constituted by the independently operable printer unit 3 is prepared beforehand, and then the scanner unit is attached thereto.

Namely, in the power-off state of the network printer, the scanner unit 2 and the printer unit 3 are connected using the connection cable 50, and then the switch is powered on. Then, upon turning ON the power, the structure of the image processing unit is switched after confirming the connected state of the scanner unit 2. Namely, in the system checking after turning on the power switch, the digital copying machine 1 is recognized as an image processing apparatus wherein the scanner unit 2 and the printer unit 3 are combined.

In the above explanations, all of the printer-side interfaces 10 are set ineffective; however, it is possible to display a minimum amount of information without adversely affecting the scanner-side user interface 5. Namely, the operability of the scanner-side user interface 5 can be ensured for displaying an overall information on the digital copying machine 1, and information can be displayed on the printer-side user interface 10.

For example, in order to recognize the operating state of the printer unit 3, it may be arranged such that in the printer-side LED display section 12, an LED lamp for informing the state of, for example, "being charged", "being warmed up", "on standby", "abnormality", etc., may be turned ON because such minimum amount of information can be displayed without the problem of making the user confused and thus without lowering the operability of the digital copying machine 1.

As described, the image processing apparatus of the present invention includes a plurality of user interface sections, and in the normal state, only the specific user interface section is used of all the plurality of user interface sections, other interface section(s) is (are) used only when necessary. As a result, the data can be provided to the operator. Namely, by effectively utilizing a plurality of user interface sections, the operability of the image processing apparatus can be improved. In the present embodiment, the image processing apparatus provided with two user interface sections is adopted; however, the image processing apparatus provided with three or more user interface sections may be equally adopted.

The image processing apparatus of the present invention may be arranged so as to include:

an image processing section for carrying out a specific processing of image data; and first and second user interface sections for respectively displaying information regarding the processing of image data and for entering commands on the processing of image data, wherein commands for the image processing section to execute the processing are given in such a manner that when the command is entered by the first user interface section, the second user interface section is set effective as necessary.

According to the foregoing structure, the first user interface section is used in usual state, and the second user interface section is set effective as necessary so that the second user interface can be used in displaying information and entering commands. As described, by selectively utilizing the plurality of user interface sections, even for a multifunctional image processing apparatus, a user friendly system can be realized without the problem of significant reduction in operability nor making the operator confused.

The image processing apparatus of the present invention may be arranged so as to include:

an image processing section for carrying out a specific processing of image data; and first and second user interface sections for respectively displaying information regarding the processing of image data and for entering commands on the processing of image data, wherein commands on information regarding the first image processing are entered by the first user interface section, and commands on information regarding the second image processing are entered by the second user interface section.

According to the foregoing structure, by selectively using the first user interface section and the second user interface section according to the need, even for a multifunctional image processing apparatus, a user friendly system can be realized without the problem of significant reduction in operability nor making the operator confused.

The image processing apparatus of the present invention may be arranged so as to include:

an image processing section for carrying out a specific processing of image data; and first and second user interface sections for respectively displaying information regarding the processing of image data and for entering commands on the processing of image data, wherein commands on information regarding the first image processing are entered by the first user interface section, and commands on information regarding the second image processing are entered by the first user interface section and the second user interface section.

According to the foregoing structure, the first user interface section is used in usual state, and a plurality of user inter sections are used as necessary by also using the second user interface section in displaying information or entering commands. Therefore, even for a multifunctional image processing apparatus, a user friendly system can be realized without the problem of significant reduction in operability nor making the operator confused.

It may be further arranged such that the second user interface section is set ineffective in the usual state, and is set effective only when necessary to use it in displaying information regarding the second processing of image data and entering commands on the second processing.

According to the foregoing structure, the first user interface section is used in usual state, and the second user interface section is set effective only when necessary to use it in displaying information on the second processing of image data and entering commands of the second processing. Therefore, even for a multifunctional image processing apparatus, a user friendly system can be realized without the problem of significantly reducing the operability nor making the operator confused.

In the foregoing structure of the image processing-apparatus, it is preferable that the plurality of user interface sections be arranged such that when the information regarding the processing of image data is displayed in the specific user interface section, the other user interface section(s) than the specific user interface section is (are) in non-display state.

According to the foregoing structure, when displaying information on the specific user interface or giving an instruction to execute the process in the image processing section, such problem of making the user confused can be prevented.

Specifically, when displaying the information regarding the process on the specific user interface, other user interface section(s) than the specific user interface section is (are) set in the non-display state, i.e., no information on the image processing apparatus are not displayed. As a result, such problem of making the user confused by also looking at the display of other user interface section than the specific user interface section can be prevented.

The plurality of user interface sections of the image processing apparatus of the present invention, the plurality of user interface sections may be arranged such that information regarding contents of the command entered by the specific user interface section displays at least in one of the other user interface section(s).

According to the foregoing structure, the information related to the specific process in accordance with a user's instruction in the specific user interface section is displayed in other user interface section than the specific user interface section.

Namely, the information displayed in other user interface section than the specific user interface section corresponds to the operator's instruction, and therefore, for the operator, it is easy to recognize the contents of the displayed information, and such problem of making the user confused will not occur. Further, even if the information to be displayed in other user interface section than the specific user interface section are the information on the image process of low frequency of use, for example, as the displayed information is in response to the user's instruction, it is easy for the user to recognize the contents of the information. Namely, in the image processing apparatus having a plurality of user interface sections, by selectively using the plurality of user interface sections in an efficient manner, a still improved operability of the image processing apparatus can be realized.

Example 1

The following descriptions will explain one example of the present invention in reference to FIG. 1 to FIG. 7.

Figure 1:
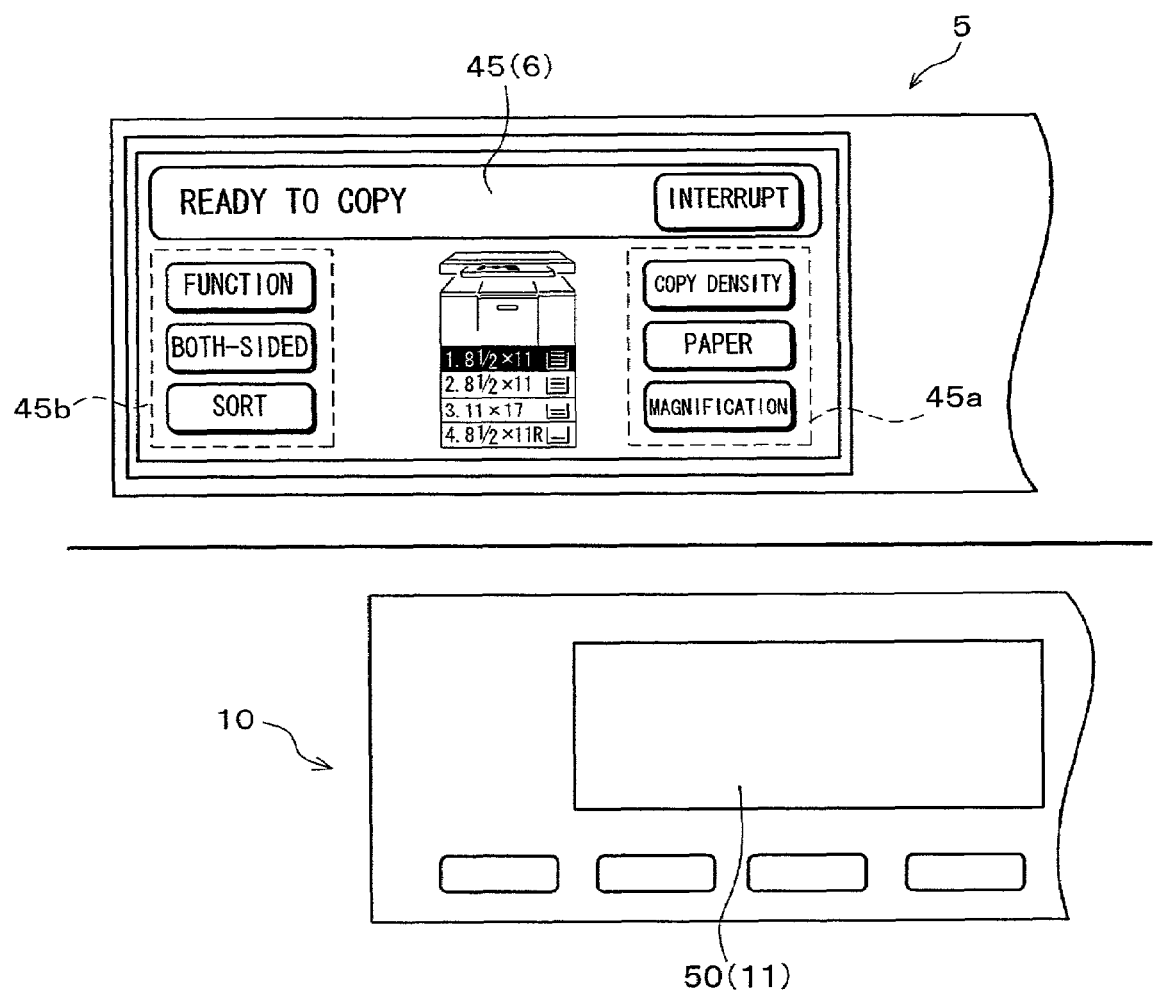
FIG. 1 is a typical depiction explaining a user interface for basic operations of a digital copying machine in accordance with one embodiment of the present invention.

FIG. 1 and FIG. 7 show the scanner-side user interface 5 and the printer-side user interface 10 explained earlier (hereinafter simply referred to as a user interface if both are not necessarily be distinguished).

The user interface to be used when performing the basic operation of the digital copying machine 1 including the scanner unit 2 and the printer unit 3 will be explained in reference to FIG. 1.

As illustrated in these figures, an image processing screen 45 is displayed on the scanner-side display panel 6. On the image processing screen 45, displayed are a set of basic function keys 45a regarding basic functions (basic operations) of the digital copying machine 1 such as "copy density", "sheet", "magnification", etc., and a set of special function keys 45b regarding specific functions (specific processing) such as "function", "both-sided", "sort", etc.

Then, by depressing the basic function keys 45a such as "copy density", "sheet", "magnification", etc., on the scanner-side display screen 45, a detailed selection can be made or a command to instructions corresponding to the key depressed can be made with respect to the scanner-side display panel 6.

Namely, a window (not shown) is displayed for making detailed selection or instruction on "copy density", "sheet", "magnification", etc., in a vicinity of (depressed) keys (for example, in the area on the right hand side of the scanner-side display panel 6), and the user can select a mode or can send an instruction as desired. Here, the printer-side user interface 10 is set ineffective, and in this state, the printer-side display panel 11 is a blank screen (non-display state) 60 in which no information is displayed.

As described, the selection or instruction on the basic operation as the digital copying machine 1 is performed using the scanner-side user interface 5 even for the process regarding the printer unit 3. In this way, it is possible to prevent a lower operability of displaying the information by the plurality of user interfaces separately. Therefore, in the typically used basic operation, the problem of making the operator confused by information displayed on the plurality of user interfaces can be surely prevented.

Namely, when performing a basic operation as the digital copying machine 1, a selection of a function or a command to execute the function can be made using only the scanner-side user interface 5. Therefore, the user can make a selection or enter a command for basic operation of the digital copying machine 1 using only the scanner-side user interface 5.

Namely, when performing a basic operation as the digital copying machine 1, a selection or entering of a command can be performed by means of only the scanner-side user interface 5. In this way, it is not necessary for the user to check a plurality of user interfaces, and an improved operability of the digital copying machine 1 can be achieved.

On the other hand, upon depressing any key in the set of special function keys 45b such as "function", "both-sided", or "sort", etc., indicative of special function (specific processing) of the digital copying machine 1, as illustrated in FIG. 7, the right of entering commands is switched to the printer-side user interface 10.

Namely, upon depressing any key in the set of special function keys 45b, in the scanner-side user interface 5, the user is informed of that a special key is selected. Then, the printer-side user interface 10 becomes effective, and a mode in which a special function of the digital copying machine 1 is operable is displayed.

For example, upon selecting the "function" key (mode) from the set of special function keys 45b, when depressing the key, as illustrated in FIG. 7, on the scanner-side display panel 6 of the scanner-side user interface 5, a function key selection screen 46 in which a "function" key is displayed black/white inverted. Further, the printer-side user interface 10 becomes effective, and on the printer-side display panel 11, a special function selection screen 51 is displayed, which shows a mode permitting a special function of the digital copying machine. Then, in the special function selection screen 51, a special function as desired can be selected by scrolling the special function displayed on the printer-side display panel 11 and operating a confirmation key 13b displayed black-and-white inverted, whereby a command to execute the special function can be entered.

As described, the digital copying machine 1 of the present embodiment is arranged such that when making a selection or entering commands on the special function (specific processing), the printer-side user interface 10 is used as the other user interface. As a result, a special function can be set in an efficient manner without lowering the operability for the user.

As described, the digital copying machine of the present embodiment is arranged such that when performing a basic function as the digital copying machine, only one user interface is used, and the other user interface(s) is (are) set ineffective, and only upon selecting a special function of the digital copying machine in the user interface being used, the other user interface(s) is (are) set effective, and the right of entering commands of the digital copying machine is switched to the other user interface(s). As a result, an improved operability of the user interface can be realized in the image processing apparatus having a plurality of user interfaces.

Example 2

The following descriptions will explain another example of the present invention in reference to FIGS. 1, 8 and 9.

When performing the basic operation of the digital copying machine 1, only the scanner-side user interface 5 is used as the user interface, and the printer-side user interface 10 is set ineffective, to attain an improved operability of the digital copying machine 1 as in the case of the Example 1. Therefore, explanations thereof shall be omitted in this example.

The scanner-side user interface 5 in the case of depressing any one of the set of special function keys 45b such as "function", "both-sided", "sort", etc., shown in FIG. 1 will be explained in reference to FIG. 8.

FIG. 8 shows the display of the interface in the case where the "function" is selected by depressing the "function" key of the set of special function keys 45b as a special function of the digital copying machine 1. As illustrated in FIG. 8, upon depressing the "function" key, the display of the scanner-side display panel 6 of the scanner-side user interface 5 is switched to a special function selection screen 47 for the selection of a specific function. Further, a list of keys for the special functions selective as functions of the digital copying machine 1 is displayed in the scanner-side display panel 6. In this state, the list of special functions is displayed in the scanner-side display panel 6, and thus the printer-side display panel 11 of the printer-side user interface 10 as the other user interface is the blank screen 60 where no special function is displayed.

Then, from the list of the special functions displayed in the special-function selection screen 47 of the scanner-side display panel 6, by depressing at least one special function key as desired, the corresponding special function is selected, and the processing of an image in the selected mode can be performed in the digital copying machine 1.

Specifically, upon depressing at least one of the special function keys as desired from the list of the special function keys, a display which informs the user of the selection of the special function is displayed in the scanner-side user interface 5. In the meantime, the printer-side user interface 10 becomes effective, and the detailed contents on the processing of the special function of the digital copying machine 1 can be set by the printer-side user interface 10.

For example, upon selecting a "back margin" key (mode) of the special function selection screen 47 of the scanner-side display panel 6, as illustrated in FIG. 9, the back margin key displayed on the scanner-side display panel 6 of the scanner-side user interface 5 is black-and-white inverted upon depressing the back margin key, and then the printer-side user interface 10 becomes effective.

Specifically, a back margin function setting screen 52 for displaying the detailed contents on the processing the back margin function as selected as the specific function is displayed on the printer-side display panel 11. Then, it becomes possible for the user to set the contents of the processing in the back margin function by the printer-side display panel 10. Further, when necessary, commands for the detailed contents of the back margin function are entered by operating the selection key 13a. Then, by operating the confirm key 13b, the detailed contents of the processing as selected can be confirmed.

As described, the digital copying machine 1 of the present embodiment is arranged such that in the state where the special function is selected by the scanner-side user interface section 5, information on the special function is displayed in the printer-side user interface 10 to allow the user to make selections on the detailed contents of the special function as selected. Namely, on the printer side user interface 10, information on the contents of the commands entered by the scanner-side user interface section is displayed. As a result, an image processing apparatus provided with the user interface sections of desirable operability, which permits the user to effectively performs necessary setting for the special function can be realized.

Second Embodiment

In the present embodiment, an image forming apparatus (image processing apparatus) such as a copying machine, etc., provided with at least independently operable scanner unit and an independently operable printer unit respectively provided with display sections will be explained.

In recent years, an image forming apparatus which can be functioned as a copying machine, a facsimile machine, etc., as explained in the above embodiment by combining an independently operable scanner unit for optically reading a document image and an independently operable printer unit for forming an image onto a sheet has an increasing demand.

In such image forming apparatus, information required for various setting on a printer unit such as a number of prints, etc., is displayed on the print data output side such as a personal computer, etc., and in the printer unit, provided is a small-size display section capable of displaying a message in "Alphabetic Numeric and Kana", in length of two lines or so. On the other hand, the scanner unit is provided with a large size display section capable of displaying graphics, for i) setting reading conditions, a receiving end of data as read, ii) displaying information required for inputting a mail address in transmitting the data an electronic mail, or iii) selecting a paper size or setting a number of copies when the scanner unit is combined with the printer unit to be functioned as a copying machine, etc.

Then, in the combined use of the scanner unit and the printer unit as the copying machine, etc., conventionally, the respective states of the scanner unit and the printer unit are displayed in respective display sections. Therefore, only a short message can be displayed in the printer-side display section, and for the message in two or more lines, it is required to scroll the display by operating the UP key or the DOWN key, thereby presenting the problem of vexatious complication in displaying complicated processes to be recovered from a paper jam, or other trouble, etc.

In response, as a typical conventional structure in consideration of the foregoing problem, Japanese Unexamined Patent No. 8-297388/1996 (Tokukaihei 8-297388) discloses a display structure in the combined use of a scanner unit and a printer unit, wherein an error or a status on the side of the printer unit is displayed using a scanner-side display input unit (operation panel).

Japanese Unexamined Patent Publication No. 6-253084/1994 (Tokukaihei 6-253084) discloses a composite machine terminal equipment provided with a variety of functions such as a print function, a copy function, a facsimile function, etc., wherein when its functions are to be expanded, an operation panel provided as a standard equipment and a detachably provided operation panel as expansion display means are controlled so that both panels can cooperatively operate, to attain an improvement in economical aspect.

In the foregoing conventional examples, complicated information on the printer unit is displayed using the large size display section of the scanner unit or other detachably attached unit. However, the above conventional display structures has such problem that the user gets confused as it is unclear which of the plurality of display sections is to be seen. For example, in a combined use of the scanner unit and the printer unit, generally, the user sees both of the display sections of these units which are provided one above the other, and performs a necessary processing based on the information displayed in either one of the display sections, which the user finds more useful.

Figure 22:
FIG. 22 is a view illustrating a display example of a display section when supplying sheets to a paper storage tray of a large volume of the printer unit in an independent use of the printer unit.

As a solution to the foregoing problem, an image forming apparatus of the present invention which offers an effective use of a large size display section of a scanner unit and which eliminates the problem of vexatious complication in referring to display sections will be explained in reference to FIG. 10 and FIG. 22.

Figure 10:
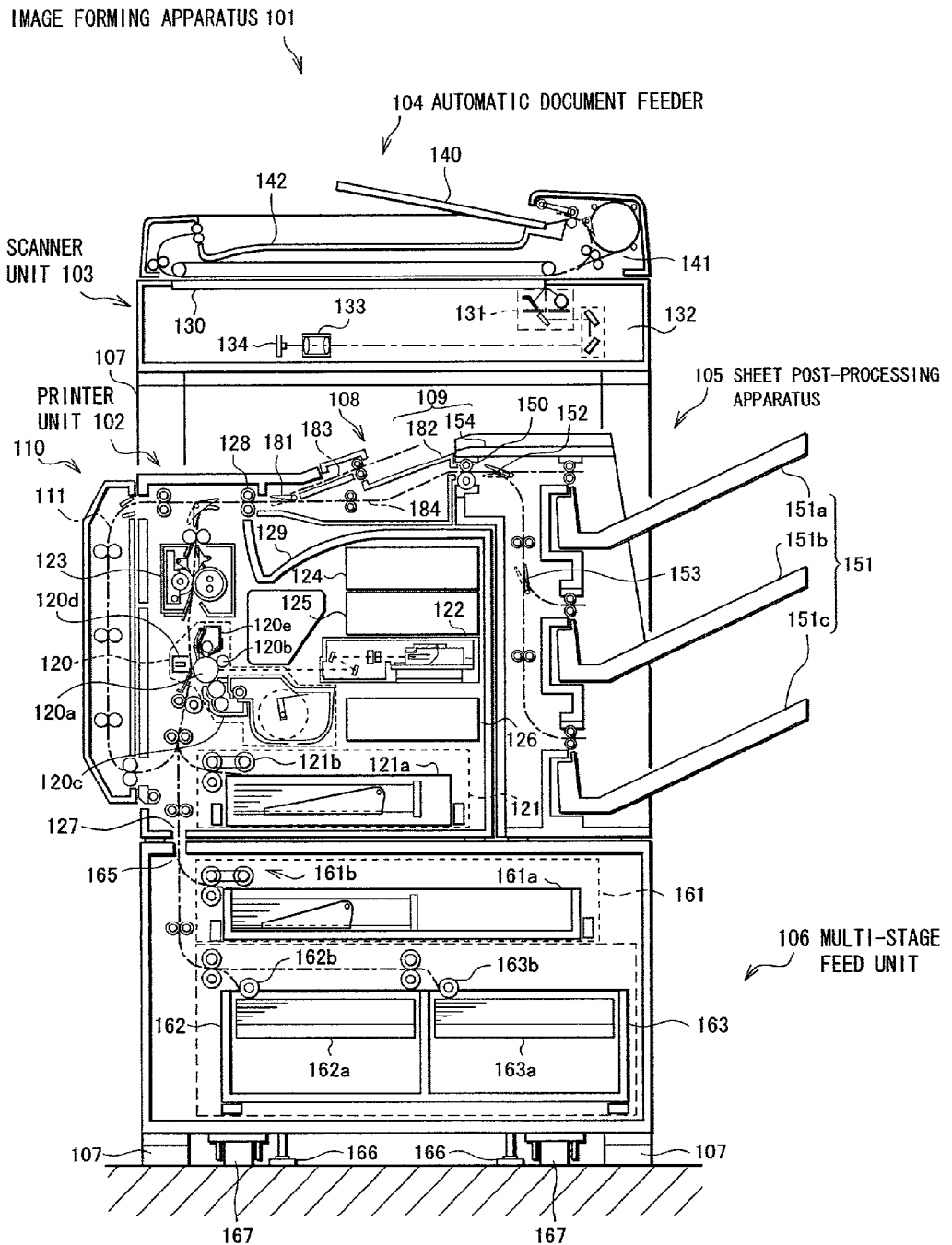
FIG. 10 is a longitudinal cross-sectional view of an image forming apparatus in accordance with the second embodiment of the present invention.

FIG. 10 is a longitudinal cross-sectional view of an image forming apparatus (image processing apparatus) 101 in accordance with the present embodiment of the present invention. The image forming apparatus 101 includes a printer unit 102 as a main unit, and also includes a scanner unit 103, an automatic document feeder 104, a sheet post-processing unit 105, a multi-stage feed unit 106, a relay transport unit 108, and a both-sided transport unit 110, so as to expand the functions thereof. The scanner unit 103 and the automatic document feeder 104 mounted thereon are supported on a system rack 107, to be placed above the printer unit 102 and the sheet post-processing unit 105.

The printer unit 102 is provided not only for printing recorded image as read by the scanner unit 103 but also outputting recorded image data as received from an external connection equipment in the connected state with an external equipment such as a personal computer, etc. The scanner unit 103 is provided with an automatic scanning mode, and a manual scanning mode. In the automatic scanning mode, an image on an original document sheet is read out by automatically supplying original document sheets by the automatic document feeder 104 one by one to be subjected to exposure scanning. In the manual scanning mode, an image on an original document sheet which cannot be fed automatically by the automatic document feeder 104 is read by manually setting the original document sheet. In the present invention, the independently operable printer unit 102 and the independently operable scanner unit 103 are combined into a system to be cooperable, to realize the functions as a copying machine or a facsimile machine, etc.

In the printer unit 102, to the left from around the center of the main body apparatus, provided is an electrophotographic processing section 120 which has a drum-shaped photoreceptor 120a at its center. Along the circumference of the photoreceptor 120a, provided are a charge roller 120b for uniformly charging the surface of the photoreceptor 120a, an optical scanning unit 122 for writing an electrostatic latent image by scanning an optical image on the uniformly charged photoreceptor 120a, a developer unit 120c for visualizing an electrostatic latent image written by the optical scanning unit 122, a transfer unit 120d for transferring the image recorded and reproduced on the photoreceptor 120a onto a sheet, a cleaning unit 120e which enables a new image to be recorded on the photoreceptor 120a by removing the developer remaining on the photoreceptor 120a, an eraser lamp unit (not shown) for removing the charge from the surface of the photoreceptor 120a, etc.

Below the main body of the printer unit 102, provided is a paper feed section 121 installed in the main body. The paper feed section 121 includes a paper storage tray 121a for storing sheets of paper, and a separate feed section 121b for separating sheets as fed from the paper feed section 121 one by one to be fed in order in between the photoreceptor 120a and the transfer unit 120d of the electrophotographic process section 120, thereby transferring recorded/reproduced image onto the photoreceptor 120a. In this structure, sheets of paper are supplied to the paper feed section 121 by pulling the paper storage tray 121a to the front side of the main body of the printer unit 102.

On the bottom surface of the main body of the printer unit 102, formed is a sheet receiving entrance 127 for sequentially feeding sheets as fed from the multi-stage feed unit 106, etc., as the peripheral equipment, etc., to a spacing between the photoreceptor 120a and the transfer unit 120d of the electrophotographic processing section 120.

Above the electrophotographic process section 120, provided is a fuser 123 which receives sheets having images transferred thereto one by one, and makes the developing agent transferred onto the sheet to be affixed thereto with an application of heat, and then discharges the resulting sheets having images permanently affixed thereto to the outside of the fixing unit 123. The sheet having an image recorded thereon is passed to the relay transport unit 108 on the upper surface of the main body of the printer unit 102 from the discharge roller 128 of the printer unit 102.

In the spacing above and below the optical scanning unit 122, provided are a printer unit control section 124, an image control section 125 and a power source unit 126. The printer unit control 124 stores therein a process control unit (PCU) substrate for controlling an electrophotogaphic process and an interface substrate for receiving image data from an external equipment. The image control section 125 includes an image control unit (ICU) substrate for carrying out a predetermined processing of image data as received from the interface substrate and scanning/recording the resulting image data as an image by the optical scanning unit 122. The power source unit 126 is provided for supplying power with respect to substrates and units of various types.

The multi-stage feed unit 106 includes three paper feed sections 161, 162 and 163 which are detachably attached to the main body, and sheets of paper stored in the paper storage trays 161a, 162a and 163a of the sheet feeder sections 161, 162 and 163 are separated by the separation feeder means 161b, 162b and 163b one by one to be placed on the upper surface of the unit 106, and is supplied to the paper discharge opening 165 connected to the paper receiving opening 127 of the printer unit 102. In the present invention, while the processing is being carried out, the paper feed section 121, 161, 162 or 163 which stores paper of size as desired is selectively operated. To the sheet feeder section 161, 162 or 163 paper can be supplied by pulling in the respective paper storage trays 161a, 162a or 163a to the front side of the unit main body, and the paper feed section 162 and the paper feed section 163 store paper in the same size.

The present embodiment is assembled such that the printer unit 102 and the post processing unit 105 are provided above the multi-stage feed unit 106, and to enable this assembly as it is to be moved to and to be fixed in the system rack 107, moving rollers 167 and fixing sections 166 are formed on the bottom surface of the multi-stage feed unit 106 as illustrated in FIG. 10. Specifically, the assembly is moved by lifting it up from the floor by rotating the fixing sections 166. On the other hand, the assembly is fixed by placing it down until the fixing sections 166 reach the floor, thereby fixing the multi-stage feed unit 106. In the above, explanations have been given through the case of adopting three paper feed sections 161, 162 and 163; however, the present invention is not intended to limit the number of the paper feed sections, and one or two, or four or more paper feed sections may be adopted. As to these paper feed sections, the structure wherein all the plurality of sheet feed sections are laminated may be adopted.

The sheet post processing unit 105 is arranged so as to receive sheets of paper having formed thereon images as discharged from the relay transport unit 108 and the printer unit 102 in the upper part of the unit 105, and carries our the post-processing for the sheets of papers. Here, non-limited examples of the post-processing include stapling, sorting, etc. The sheet post processing unit 105 of the present embodiment is arranged so as to include three discharge trays 151a, 151b and 151c, and when discharging sheets of paper, if necessary, the discharge tray 151 for discharging sheets of paper is switched by gates 152 and 153. The multi-stage feed unit 106 can be selectively used, for example, such that the upper discharge tray 151a is used for discharging sheets of paper in the copy mode, the intermediate discharge tray 151b for discharging sheets of paper in the print mode, and the lower discharge tray 151c for discharging sheets of paper in the facsimile print mode.

The scanner unit 103 performs an exposure scanning with respect to an image of an original document set on a transparent document placement plate 130 by a first scanning unit 131 and a second scanning unit 132 which move along the document placement plate 130 at a predetermined relative speed, and forming an image on a photoelectronic transfer unit 134 using optical components such as a mirror, an image forming lens 133, etc., thereby outputting the image on the original document after being converted into an electronic signal.

The automatic document feeder 104 includes a document transport section 141 for transporting an original document placed on a document set tray 140 onto the document placement plate 130 and discharging the document after the scanning onto a document discharge tray 142. The automatic document feeder 104 is arranged such that the front side thereof can be opened and closed by rotating it upwards about the back side of the automatic document feeder 104 or downwards to the original closed position so that an original document sheet, which cannot be fed by the automatic document feeder 104, can be placed on the document placement plate 130 for the scanning.

The intermediate transport unit 108 is provided above a discharge tray 129 mounted on top of the main body of the printer unit 102. This intermediate transport unit 108 is provided for feeding sheets having images recorded thereon as discharged from the printer unit 102 towards the sheet post-processing unit 105 provided on the downstream side of the printer unit 102. From the midway of a sheet transport path 184 of the relay transport unit 108, another sheet transport path 183 is branched for guiding sheets of paper onto the discharge tray 109 composed of the upper surface 182 of the relay transport unit 108 and the upper surface 154 of the sheet post processing unit 105. Either one of these discharge ends can be selected by switching a gate 181 provided at the branch section of the transport path.

The described discharge tray 109 is also functioned as an inverse transport path for the sheets of paper, and together with the detachably mounted both-sided transport unit 110, this discharge tray 109 enables images to be formed on both sides of the sheet of paper.

Figure 11:
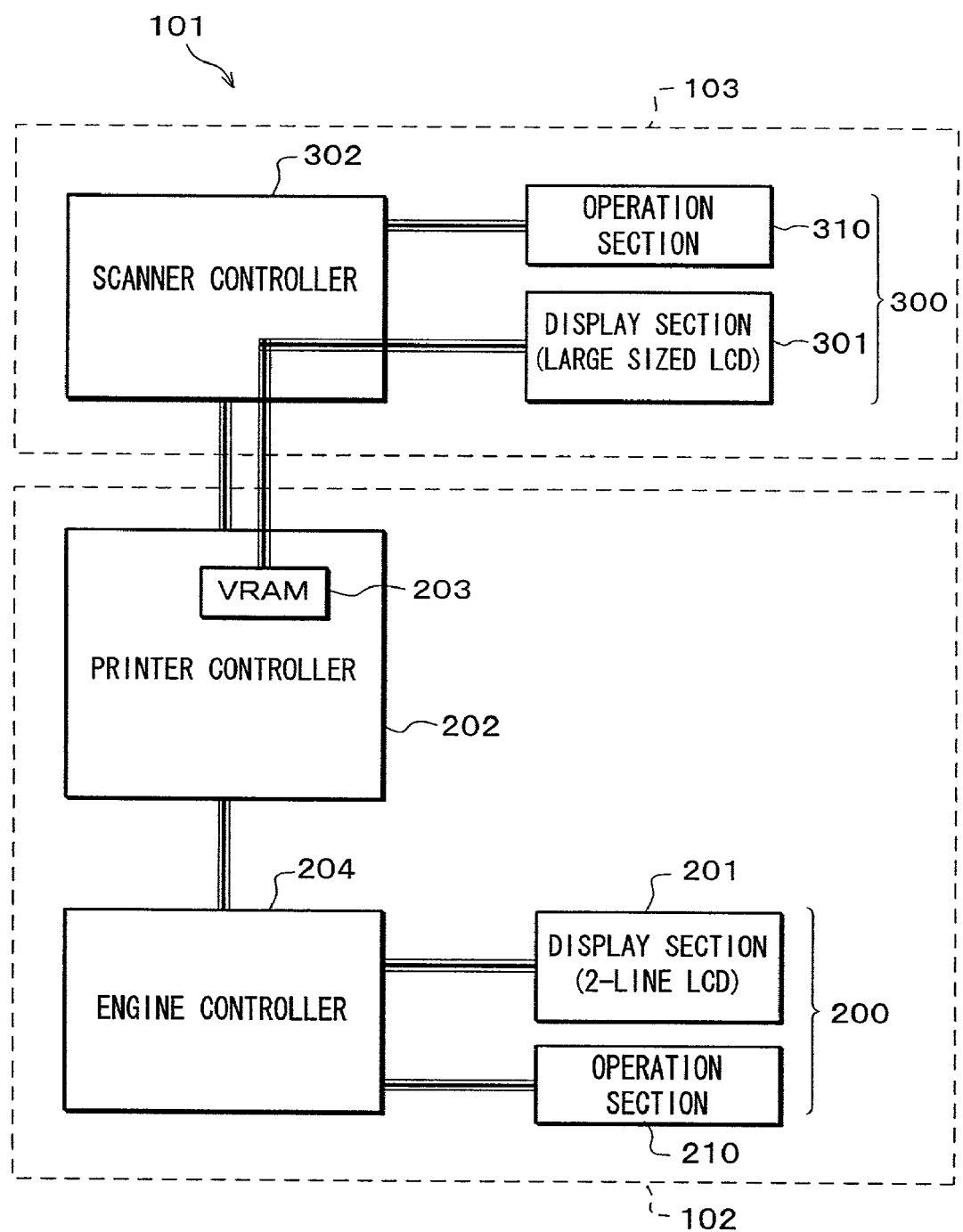
FIG. 11 is a block diagram illustrating the structure with regard to a display control of a printer unit and a scanner unit in the image forming apparatus of FIG. 10.

FIG. 11 is a block diagram schematically illustrating display control structures of the printer unit 102 and the scanner unit 103 respectively provided with a display section 201 and a display section 301. The display section 201 of the printer unit 102 is constituted by a small size LCD (Liquid Crystal Display Device), while the display section 301 of the scanner unit 103 is constituted by a large size LCD. The essential feature of the present invention with regard to the display control structures lies in that in the independent use of the printer unit 102, various information such as a message indicative of paper jam, etc., is displayed on the small size display section 201 of the printer unit 102, while in the combined use of the printer unit 102 with the scanner unit 103, not only the information on the scanner unit 103 but also the information on the printer unit 102 are displayed on the large size display section 301 of the scanner unit 103. In normal state, no information is displayed in the display section 201 of the printer unit 102 (blank display).

More specifically, the display section 301 of the scanner unit 103 is connected to a scanner controller 302 serving as a display control section of the display section 301 of the scanner unit 103, and the scanner control section 302 is connected to a printer controller 202 serving as a display control section of the display section 201 of the printer unit 102 via bus line, etc. Namely, in the image forming apparatus 101 of the present embodiment, detailed information regarding the scanner unit 103, the printer unit 102 and an entire system, which are to be displayed in the display section 301 of the scanner unit 103 are all controlled by the printer controller 202. Therefore, in the image forming apparatus 101, both the display contents of the printer unit 102 and the display contents of the scanner unit 103 are stored beforehand in a VRAM (Video Random Access Memory) 203 of the printer controller 202.

As described, respective information on the display of the printer unit 102 and the display of the scanner unit 103 are unitary managed by the printer controller 202 provided in the printer unit 102, and it is possible to save the memory. However, in consideration of the case where the VRAM 203 in the printer unit 102 is used in combination with the scanner unit 103 (as a system), the VRAM 203 also stores information on the contents to be displayed on the large size display section 301 of the scanner unit 103. Namely, in the state where the scanner unit 103 is not attached, the information of the system, including messages in "Alphabetic Numeric and Kana", etc., to be displayed in the small size display section 201 and the drawing data and character data to be displayed in the large size display section 301 are stored into the VRAM 203 for each display information. On the other hand, in the state where the scanner unit 103 is attached, the display information of the system including only the drawing data and character data to be displayed in the large size display section 301 are stored in the VRAM 203 for each piece of display information.

Further, a driver for the display section 201 of the printer unit 102 is possessed by an engine controller 204. Namely, a display in the display section 201 of the printer unit 102 is performed by the engine controller 204 based on a character string command sent from the printer controller 202. Further, in response to an input operation by the operation section 201 composed of keys of various kinds to be described later, the engine controller 204 sends a command to the printer controller 202. Namely, the engine controller 204 recognizes which key is operated, and informs the contents as recognized to the printer controller 202.

In response to an input operation performed with respect to the operation section 310 composed of keys of various kinds of the scanner unit 103, the scanner controller 302 sends a command to the printer controller 202. Namely, the scanner controller 302 recognizes which key is operated, and informs the contents as recognized to the printer controller 202.

Figure 12:
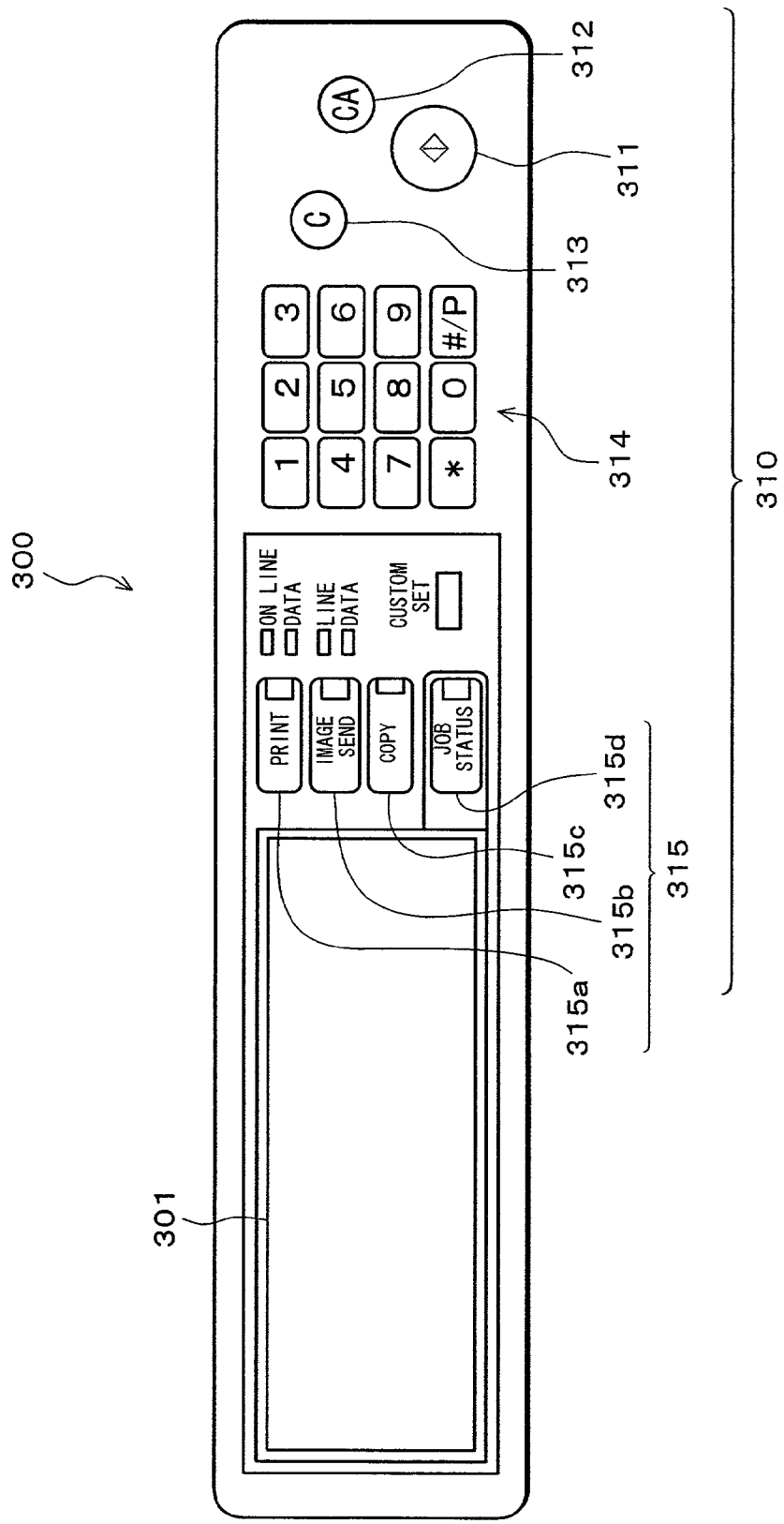
FIG. 12 is a front view of an operation panel provided in the scanner unit of FIG. 11.

FIG. 12 is a front view of an operation penal 300 of the scanner unit 103. This operation panel 300 is mounted on the upper surface of the scanner unit 103, and includes the large-size display section 301, and an operation section 310. In the present invention, an overall system can be controlled by using the operation panel 300. The keys of various kinds formed on the operation section 310 include a start key 311, an all clear key 312, a clear key 313, a ten key 314, and a set of mode switch keys 315, which includes a print mode key 315a, an image send key (scan mode key) 315b, a copy mode key 315c, and a job status key 315d.

The start key 311 is a key for entering a command to start the corresponding processing in a mode set by each of the keys of various kinds. The all clear key 312 is provided for resetting the image forming apparatus 101 to the standard mode by clearing all the currently selected setting. The clear key 313 is provided for clearing a currently selected setting, for example, as input using a ten key 314, etc. The ten key 314 is provided for inputting numeric data such as a number of copies, etc. The mode switch keys 315a, 315b and 315c are provided for switching the processing mode. The job status key 315d is provided for displaying a progress report of the job (key for displaying the job(s) on standby).

Figure 13:
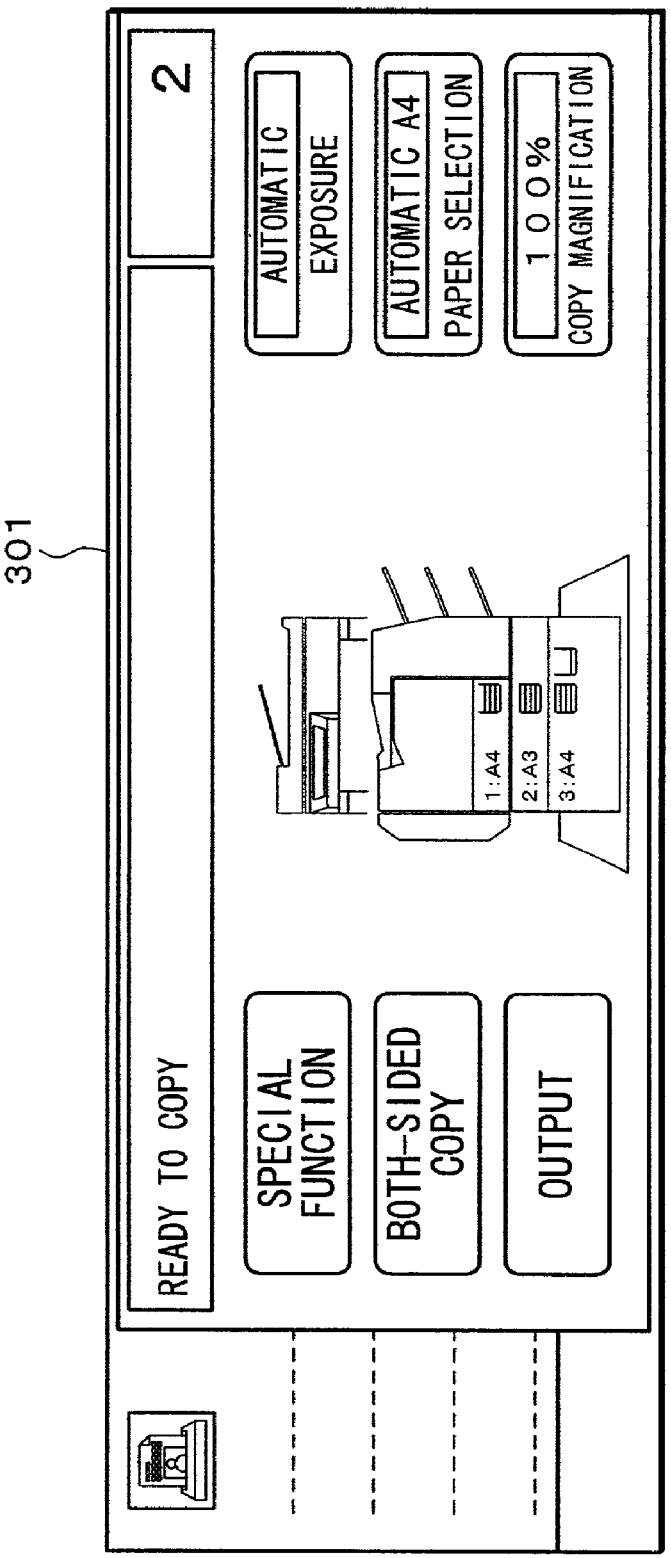
FIG. 13 is a view illustrating a copy mode screen that is a default screen in a display section of the operation panel of the scanner unit of FIG. 11.
Figure 14:
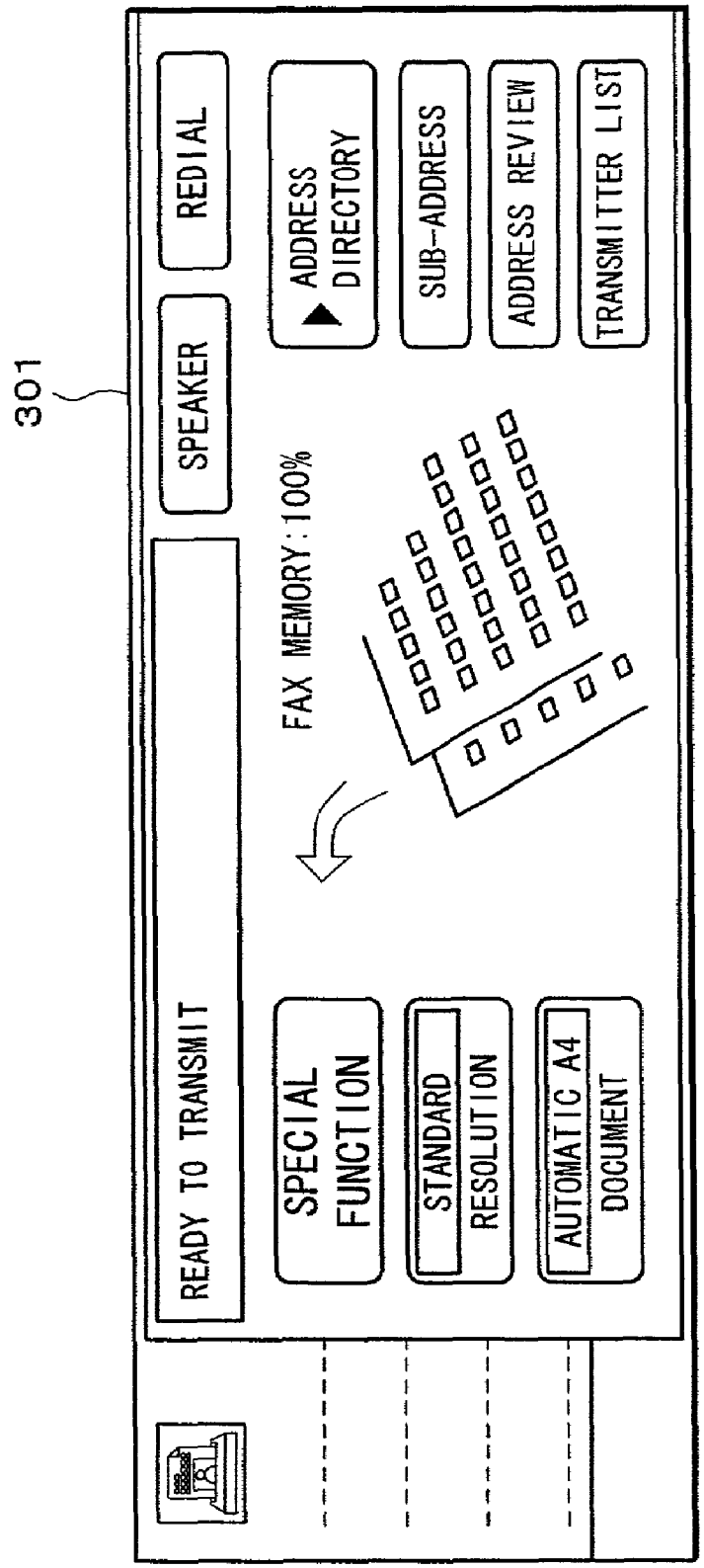
FIG. 14 is an explanatory view illustrating an image send mode screen in the display section of the operation panel of the scanner unit of FIG. 11.

A default screen (standby screen) on the display section 301 of the operation panel 300 having the foregoing structure is a copy mode screen as illustrated in FIG. 13. Here, for example, upon operating the image send key 315b, for switching the processing mode, it is switched from the copy mode to the image send mode, and the screen displayed in the display section 301 is as shown in FIG. 14. Here, the scan mode indicates a processing mode in which image data of an original document as read by the scanner unit 103 is transmitted to the receiving end, such as a facsimile transmission mode, SCAN TO E-mail mode, SCAN TO FTP (FTP: File Transfer Protocol) mode, etc.

When the user depresses the job status key 315d for displaying the screen for the progress report of the job, for example, a screen as illustrated in FIG. 15 is displayed which allows the user to check the status of the job on standby.

Figure 16:
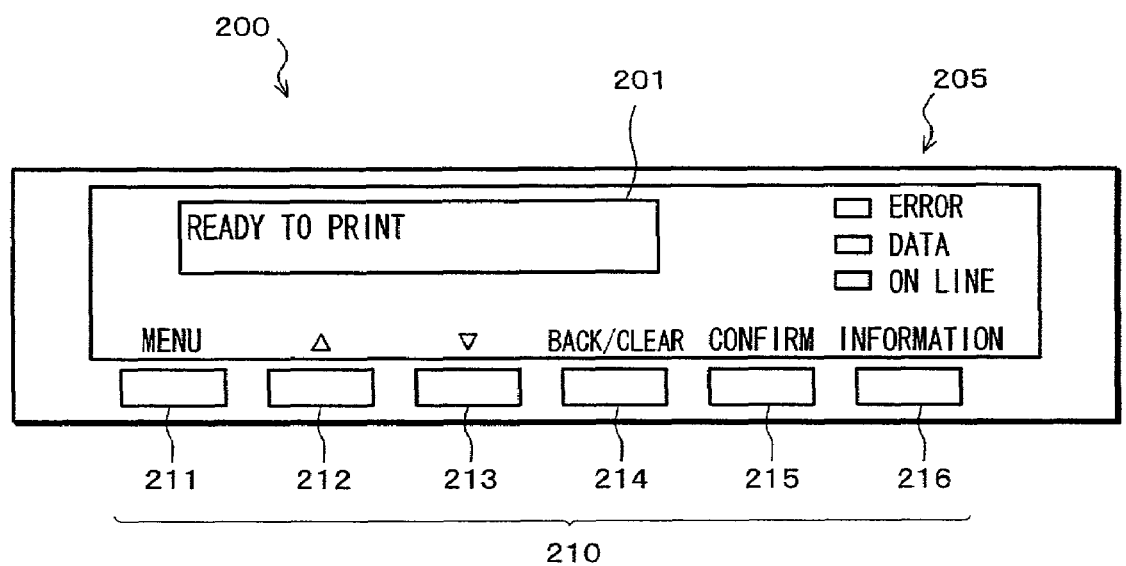
FIG. 16 is a front view of the operation panel provided in the printer unit of FIG. 11.

As described, the printer unit 102 is independently operable, and therefore the printer unit 102 is also provided with an operation panel 200, for example, as illustrated in FIG. 16. The operation panel 200 includes the described small size display section 201, the display section 205 composed of the LED (Light Emitting Diode), and an operation section 210. The display section 205 is switched ON/OFF according to the display state of the printer unit 102.

The operation section 210 includes a menu key 211, an up key 212, a down key 213, a back/end key 214, a confirm key 215 and an information key 216.

Figure 17:
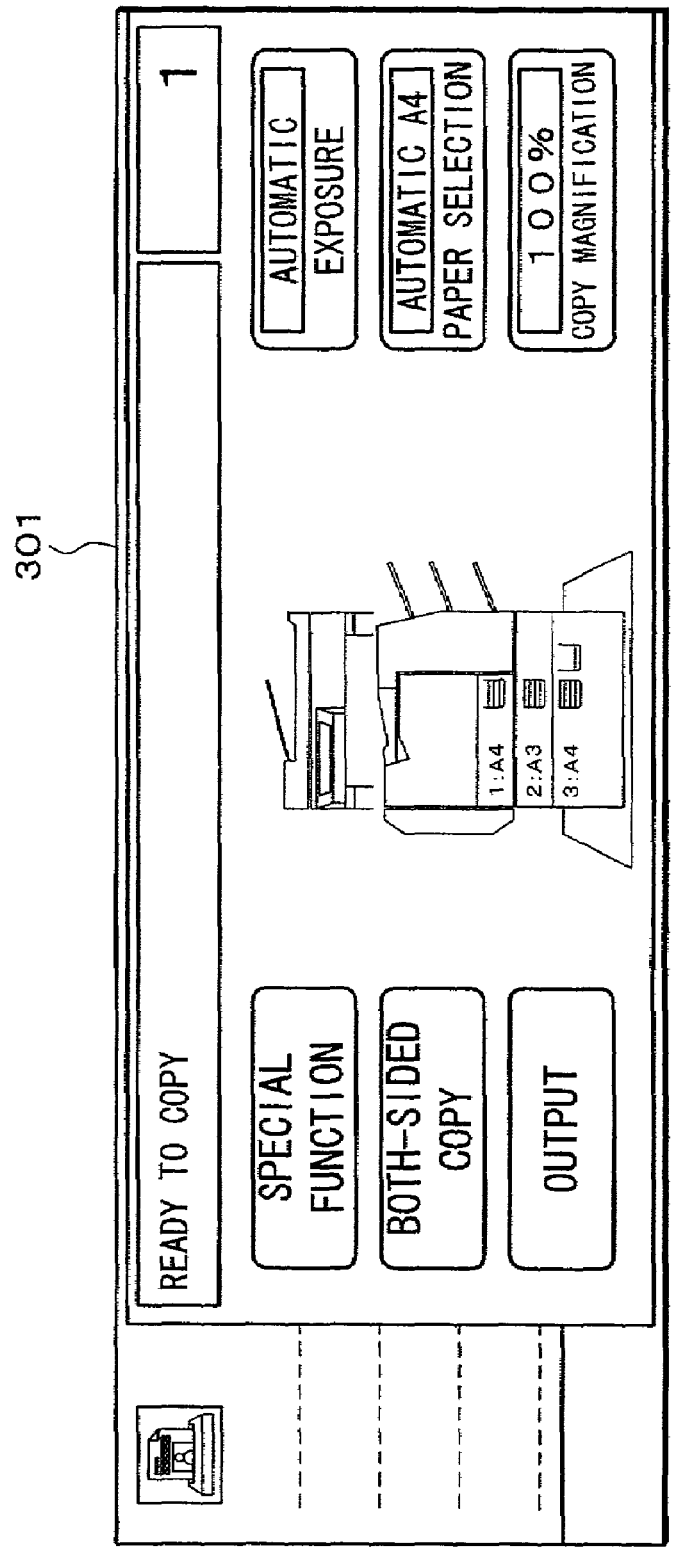
FIG. 17 is an explanatory view illustrating a copy mode screen that is a default screen in the display section of the operation panel of the scanner unit of FIG. 11.

In the following, the display structure of the image forming apparatus 101 of the foregoing structure will be explained in details while comparing a display example for the display section 301 of the scanner unit 103 with a display example for the display screen 201 of the printer unit 102. The display example illustrated in FIG. 17 of the display section 301 is a default screen (standby screen). In the wait state, the image forming apparatus 101 is set in the copy mode. Therefore, a screen for the copy mode is displayed in the display section 301.

Figure 18:
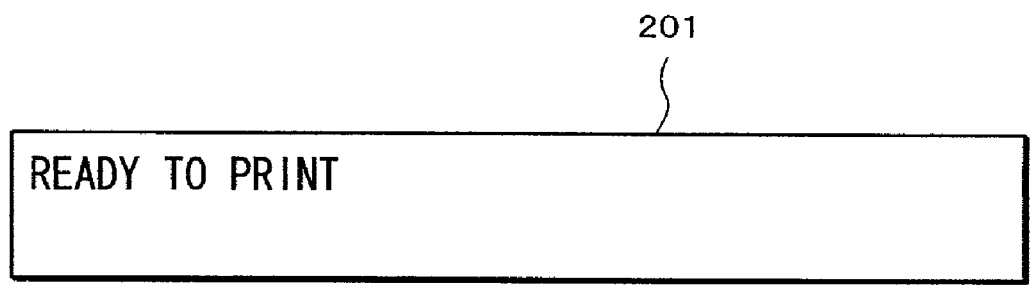
FIG. 18 is a view illustrating a default screen in an independent use of the printer unit.

On the other hand, no information is displayed in the display section 201 of the printer unit 102 (blank display). In the independent use of the printer unit 102, only a printing operation is permitted, and the standby screen as illustrated in FIG. 18 is displayed.

Figure 19:
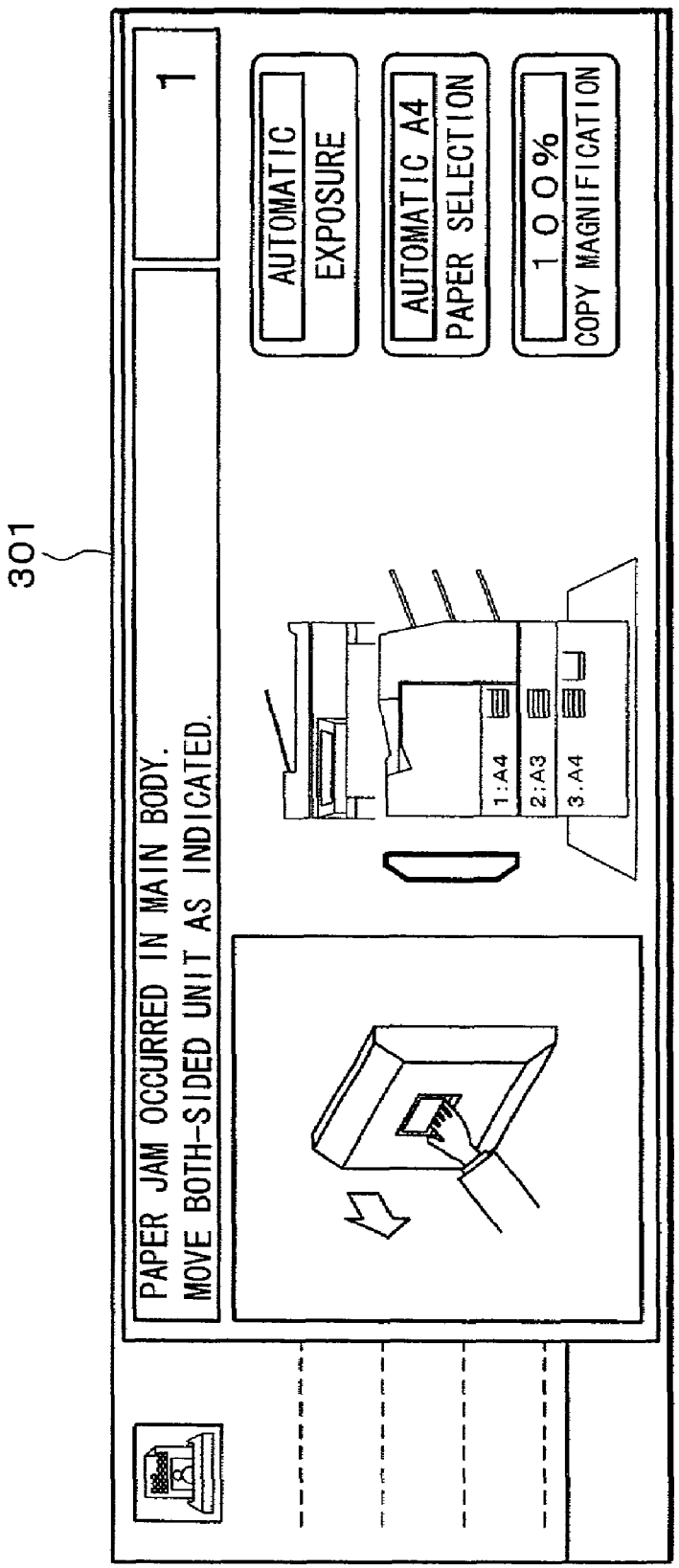
FIG. 19 is a view illustrating a display example of a display section of a scanner unit when a paper jam occurred in a transport path of a printer unit.

FIG. 19 illustrates a display example of the display section 301 when a paper jam occurs in a longitudinal transport path 111 of the printer unit 102. As illustrated, in the display section 301, the steps for recovering from the paper jam are guided with drawings in the display section 301. Here, the portion corresponding to the both-sided transport unit 110 of the image forming apparatus 101 is displayed in different manner from other parts so as to receive the user's attention to that part. Further, the steps of opening the both-sided transport unit 110 are also displayed in an enlarged scale. With this display of the display section 301, the user can recognize at a glance the complicated steps of recovering from the paper jam by indicating the user, for example, the part of the apparatus to be released to remove the jammed paper, etc.

In contrast, no information is displayed (blank display) in the display section 201 of the printer unit 102. In the independent use of the printer unit 102, as illustrated in FIG. 20, a short message in "Alphabetic Numeric and Kana" in length of at most two lines is displayed in the display section 201. Therefore, it is difficult for the user to recognize the steps for recovering from the paper jam.

Figure 21:
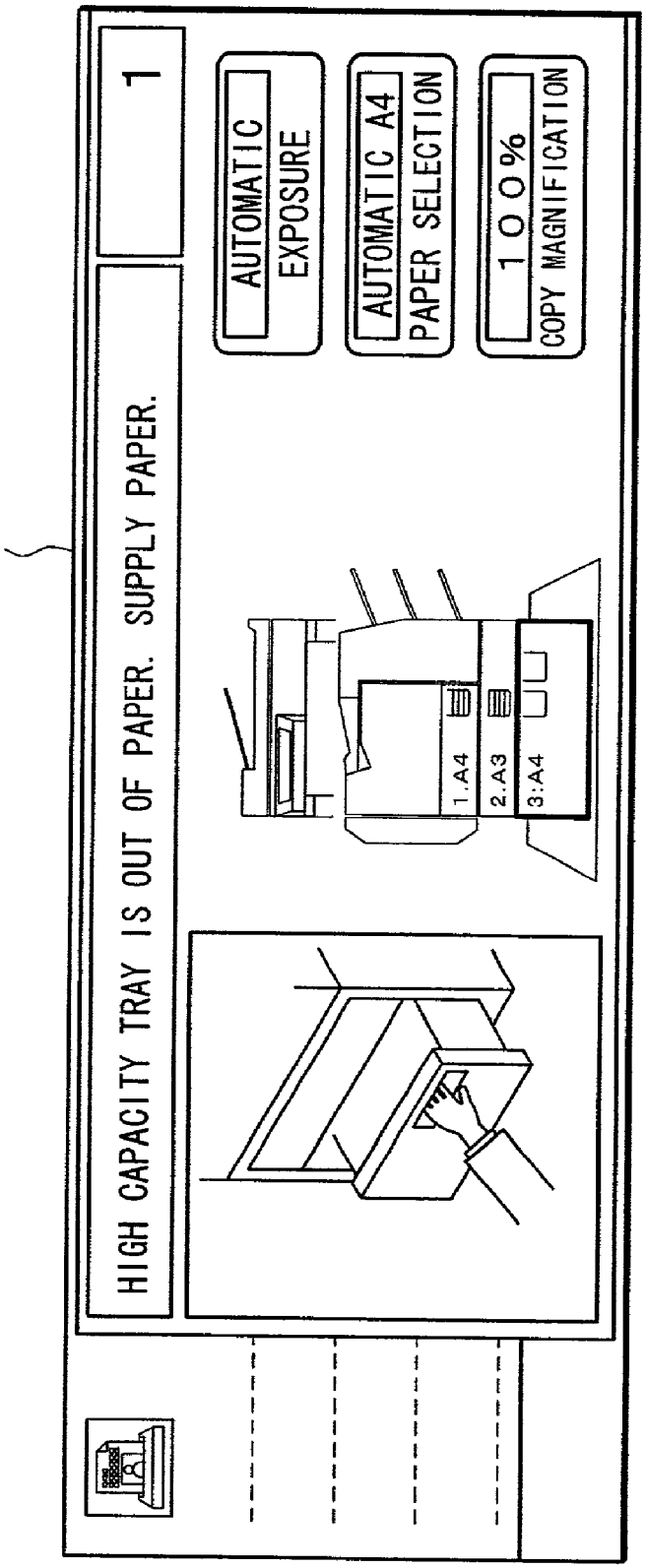
FIG. 21 is a view illustrating a display example in the display section of the scanner unit when supplying paper to a paper storage tray of large volume.

FIG. 21 illustrates a display example of the display section 301 of the scanner unit 103 in the case where the high capacity paper storage trays 162a and 163a are out paper, and sheets of paper are to be supplied thereto. In this case also, the steps for supplying paper are guided with drawings. Specifically, the portion corresponding to the paper storage trays 162a and 163 of the image forming apparatus 101 is displayed in different manner from other parts, by flashing, etc., so as to receive the user's attention to that portion, and further, the steps of pulling in the paper storage trays 162a and 163a are also displayed in an enlarged scale, whereby the user can recognize the steps of supplying paper with ease, and an improved operability can therefore be achieved.

In contrast, no information is displayed (blank display) in the display section 201 of the printer unit 102. In the independent use of the printer unit 102, as illustrated in FIG. 22, a short message indicative of the same contents is displayed in the display section 201 of the printer unit 102 in "Alphabetic Numeric and Kana" in at most two lines, which is difficult for the user to recognize the steps of supplying paper.

As described, the image forming apparatus 101 of the present invention constitutes a system in combination of the independently operable printer unit 102 equipped with the display section 201, and the independently operable scanner unit 103 equipped with the large-size display section 301, wherein in the normal state, detailed data on the entire system including the printer unit 102 is displayed only in the large-size display section 301 of the scanner unit 103, and no information is displayed in the display section 201 of the printer unit 102. With this display structure, the user needs to refer to only the information displayed in the display section 301 of the scanner unit 103, and therefore an improved display service for the user can be realized in terms of simplicity, operability, convenience, and also the effect of reducing power consumption can be expected.

The image processing apparatus 101 of the present embodiment may be arranged such that an input operation of the operation section 210 or 310 is permitted in the state where information is displayed in the corresponding display section 201 or 301. With this arrangement, the user can perform an input operation only by using the operation section related to the display section being used, and the simplified input operation can therefore be realized.

The following will explain another embodiment of the present invention with reference to FIGS. 23 to 27(d).

An image forming apparatus of the present embodiment has the same basic structure as the image forming apparatus 101 of the previous embodiment as explained in reference to FIGS. 10 to 12 and 16, and the explanations thereof shall be omitted here. The present embodiment is characterized in that a display section 201 of the printer unit 102 which displays different information from the information displayed in the display section 301 of the scanner unit 103 in the combined use of the printer unit 102 and the scanner unit 103 is adopted in replace of the display section 201 which does not show any information (blank display) in such combined use adopted in the previous example.

For example, in a display example of FIG. 23, the display section 201 of the printer unit 102 displays current time as different information from the information displayed in the display section 301 of the scanner unit 103. The display section 301 may be arranged so as to display an amusement use display such as character scrolling or animation screen, etc. According to the display structure of this example, it is possible to provide other information to the user without the problem of vexatious complication in checking the displayed contents.

In another example shown in FIG. 24(*a*) and FIG. 24(*b*), current time is displayed in the screen shown in FIG. 24(*a*) as different information from the information displayed in the display section 301 as in the case of FIG. 23. In this example, upon operating the operation section 210 provided next to the display section 201, the display screen is switched to a display of FIG. 24(*b*) which displays the contents of the job being performed by the printer unit 102. When operating the printer unit 102, the user desires for the information regarding the printer unit 102 being used. Therefore, by displaying the state of the printer unit 102 as shown in FIG. 24(*b*), interfaces which are easy to recognize can be realized.

Here, it may be arranged so as to reset the display of the printer unit 102 to the original display using a timer, or to display only when a corresponding key of the operation section 210 is operated.

Figure 25:
FIG. 25 is an explanatory view illustrating still another display example of the printer unit of another image forming apparatus in accordance with the second embodiment of the present invention.

A still another display example is shown in FIG. 25. In this display example, the display section 201 displays as different information from the information displayed in the display section 301, a failure in the scanner unit 103 if the printer controller 202 determines that some failure has occurred in the scanner unit 103. In the event that a failure has occurred in the scanner unit 103, the display system of the display section 301 may not be functioned properly. In response, this example of the present embodiment is arranged so as to immediately inform the user of an occurrence of failure in the scanner unit 103 by displaying a message indicative of an occurrence of the failure using the display section 201 of the printer unit 102 to call for the user's attention, which is the blank display in the normal state. As a result, a downtime of the apparatus due to the failure of the scanner unit 103 can be reduced.

Figure 26:
FIG. 26(a) is an explanatory view illustrating another display example in the printer unit of another image forming apparatus in accordance with the second embodiment of the present invention.
FIG. 26(b) is an explanatory view illustrating another display example in the printer unit, which is to be alternately displayed with the display of FIG. 26(a), of another image forming apparatus in accordance with the second embodiment of the present invention.
Figure 26:

A yet still another display example of the display section 201 is shown in FIGS. 26(*a*) and 26(*b*). In this display example, as shown in FIG. 26(*a*), as different information from the information displayed in the display section 301, the display section 201 displays a message indicative of an occurrence of a failure in the scanner unit 103 as in the case of FIG. 25. Further, display section 201 also displays as shown in FIG. 26(*b*) a message indicative of the contents of the job being performed by the printer unit 102 as in the case of FIG. 24(*b*). The display section 201 of in this example is arranged such that the display of FIG. 26(*a*) and the display of FIG. 26(*b*) appear alternately. Even when some failure occurs in the function of the scanner unit 103, the printer unit 102 can be expected to be functioned properly. Therefore, by alternately displaying the message indicative of the contents of the job being performed by the printer unit 102 and the message indicative of the occurrence of the failure in the scanner unit 103, it is possible to inform the user the user of both an occurrence of failure and the printing state.

Figure 27:
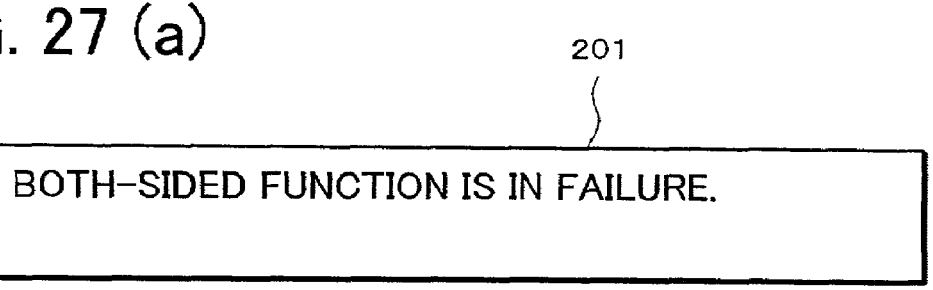
FIG. 27(a) is an explanatory view illustrating another display example in a printer unit of another image forming apparatus in accordance with the second embodiment of the present invention.
FIG. 27(b) is an explanatory view illustrating another display example in a printer unit of another image forming apparatus in accordance with the second embodiment of the present invention.
FIG. 27(c) is an explanatory view illustrating another display example in a printer unit of another image forming apparatus of the second embodiment.
FIG. 27(d) is an explanatory view illustrating another display example in a printer unit of another image forming apparatus of the second embodiment of the present invention.
Figure 27:
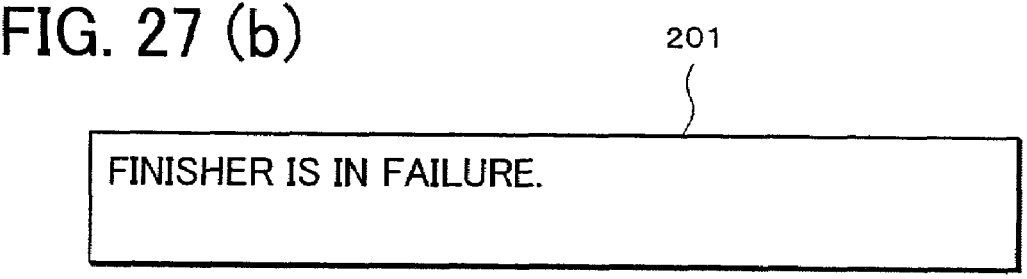
Figure 27:
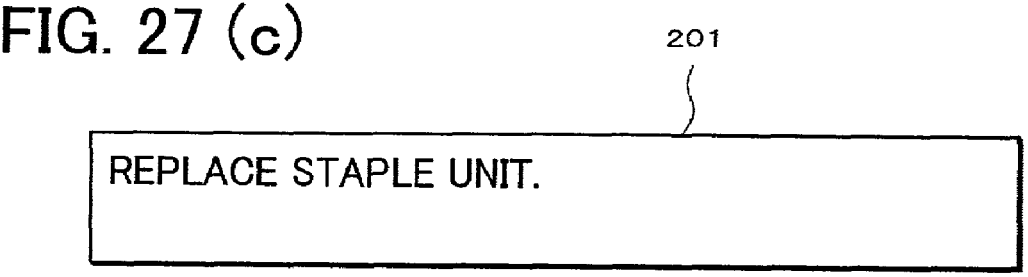
Figure 27:
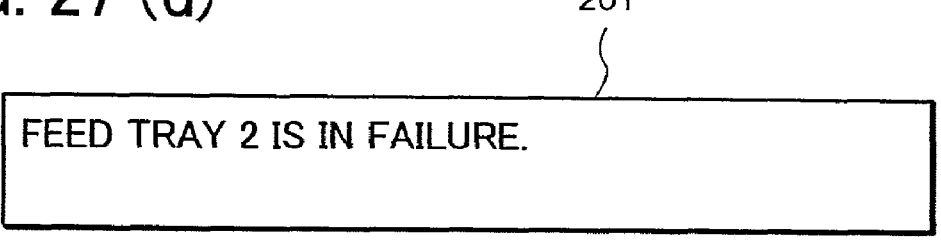

A yet still another display example of the display section 201 is shown in FIGS. 27(*a*) through 27(*d*). In this display example, as different information from the information displayed in the display section 301, the display section 201 displays a message indicative of an occurrence of some failure in an optional unit to be used in combination with the printer unit 102. Specifically, in this display example, FIG. 27(*a*) displays a message indicative of an occurrence of a failure in the both-sided function caused by some mechanical trouble in the both-sided transport unit 110. FIG. 27(*b*) displays a message indicative of an occurrence of a failure in the post-processing function caused by some mechanical trouble occurred in the sheet post-processing unit 105. FIG. 27(*c*) displays a message indicative of that the post-processing function is disabled by other reason than the mechanical trouble in the sheet post-processing unit 105, such as running out of needles for a stapler, etc. FIG. 27(*d*) displays a message indicative of, for example, a failure in the feed unit 161.

Conventionally, the user is informed of a failure in the optional unit from a displayed message indicative of that the optional unit is disabled by a failure occurred in the optional unit upon selecting a mode using that optional unit. For example, in the case of the failure occurred in the sheet post-processing unit 105, upon selecting a 1→2 (both-sided copying from the single-sided document) mode or a 2→2 (both-sided copying from the both-sided document) mode in the operation section 310 of the scanner unit 103, a message indicative of that "the both-sided function is in failure" is displayed. With this conventional structure, however, the informing of a message indicative of an occurrence of a failure may be delayed, and thus an appropriate action for the failure may not be timely taken. In response, according to this example of the present invention, upon confirming an occurrence of a failure in any of the optional units, a message indicative of an occurrence of failure is displayed in the display section 201 of the printer unit 102. As a result, as in the case of an occurrence of a failure in the scanner unit 103, it is possible to promptly inform the user of an occurrence of the failure in the optional unit, and the downtime due to a failure of the optional unit can therefore be reduced.

Figure 28:
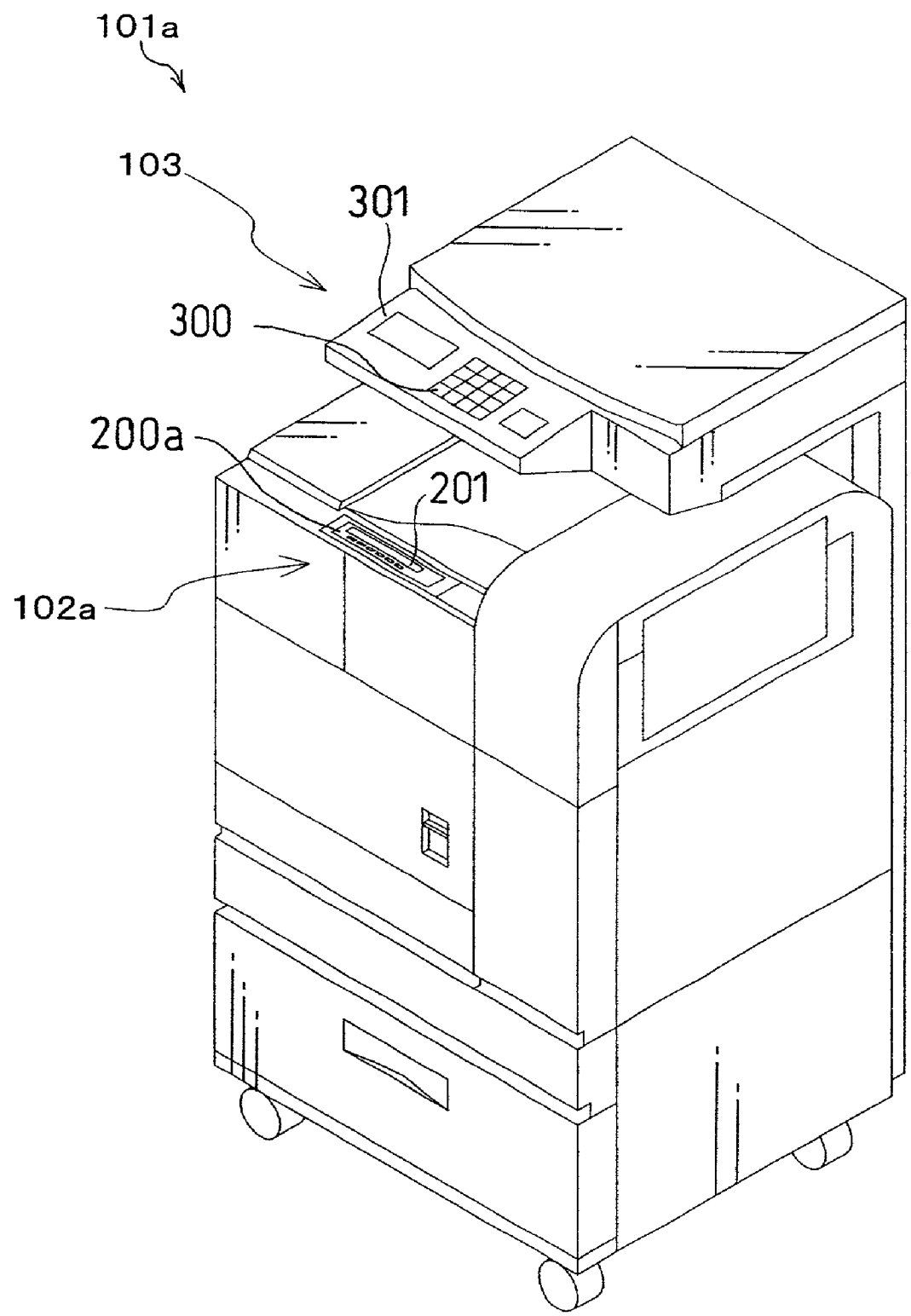
FIG. 28 is a perspective view of still another image forming apparatus in accordance with the second embodiment of the present invention.
Figure 29:
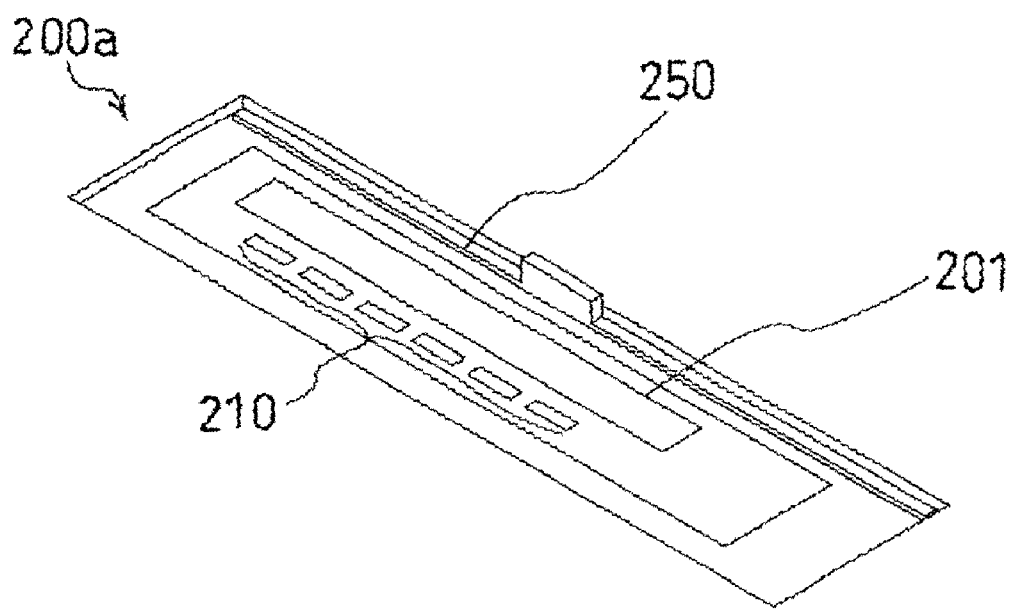
FIG. 29(a) is a perspective view explaining an operation of a slide shutter in the image forming apparatus of FIG. 28, which shows an open state of the slide shutter.
FIG. 29(b) is a perspective view explaining an operation of a slide shutter in the image forming apparatus of FIG. 28, which shows an open state of the closed state of the slide shutter.
Figure 29:
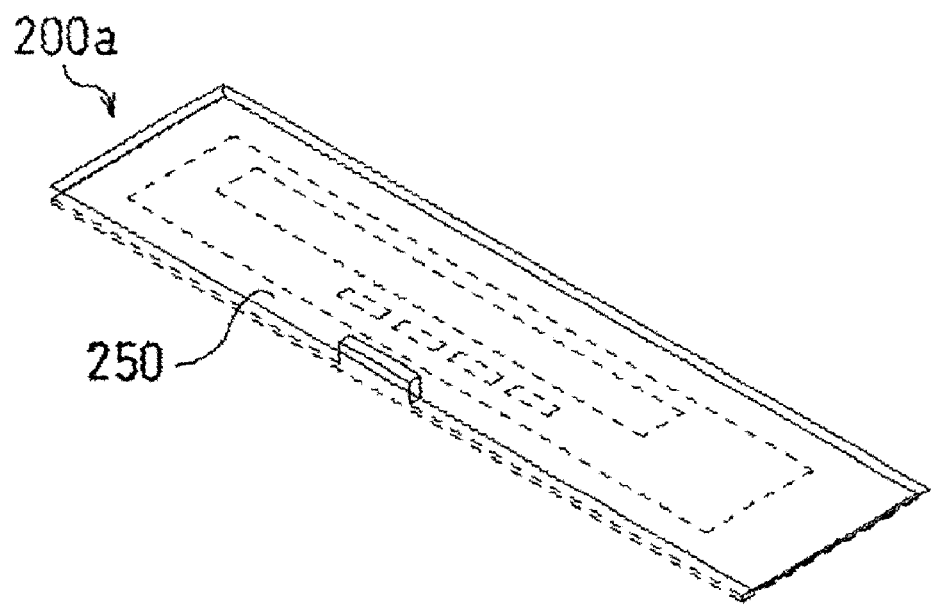

The following will explain still another embodiment of the present invention with reference to FIG. 28, FIG. 29(*a*) and FIG. 29(*b*).

FIG. 28 is a perspective view of an image forming apparatus 101*a* in accordance with still another example of the present embodiment. For ease of explanation, members having the same functions as those shown in the drawings pertaining to the above-discussed image forming apparatus 101 will be given the same reference symbols, and explanation thereof will be omitted here. The image forming apparatus 101*a* is characterized by being provided with a slide shutter 250 which can cover an operation panel 200*a* of a printer unit 102*a*. This slide shutter 250 can be opened and closed under the control of the printer controller 202 explained earlier. In the image forming apparatus 101 of the previous embodiment, in the combined use of the printer unit 102 with the scanner unit 103, the display section 201 of the printer unit 102 shows a blank display. In contrast, the image forming apparatus 101*a* of this embodiment is arranged such that in the combined use of the printer unit 102 with the scanner unit 103, the slide shutter 250 is closed so that the display section 201 itself becomes invisible by the user.

Specifically, in the independent use of the printer unit 102*a*, as illustrated in FIG. 29(*a*), the slide shutter 250 is opened so that the display section 201 is visible by the user. On the other hand, in the combined use of the printer unit 102a with the scanner unit 103, the slide shutter 250 is closed as illustrated in FIG. 29(b).

In the foregoing display structure, in the closed state of the slide shutter 250, the display section 201 is not necessarily be a blank display, and the display section 201 may be arranged shows a display similar to those of the conventional display structure. In this way, although the effect of reducing power consumption cannot be expected, it is possible to suppress a modification in system to the minimum. Further, between the opened state and the closed state of the slide shutter 250, it is not necessarily switch the operation section 210 between an input operation permitted state and an input operation prohibited state.

According to the foregoing structure, the user does not need to confirm the contents displayed in the display section 301 but only needs to see the display section 301 itself, whereby a still improved solution to the problem of vexatious complication can be achieved.

Figure 30:
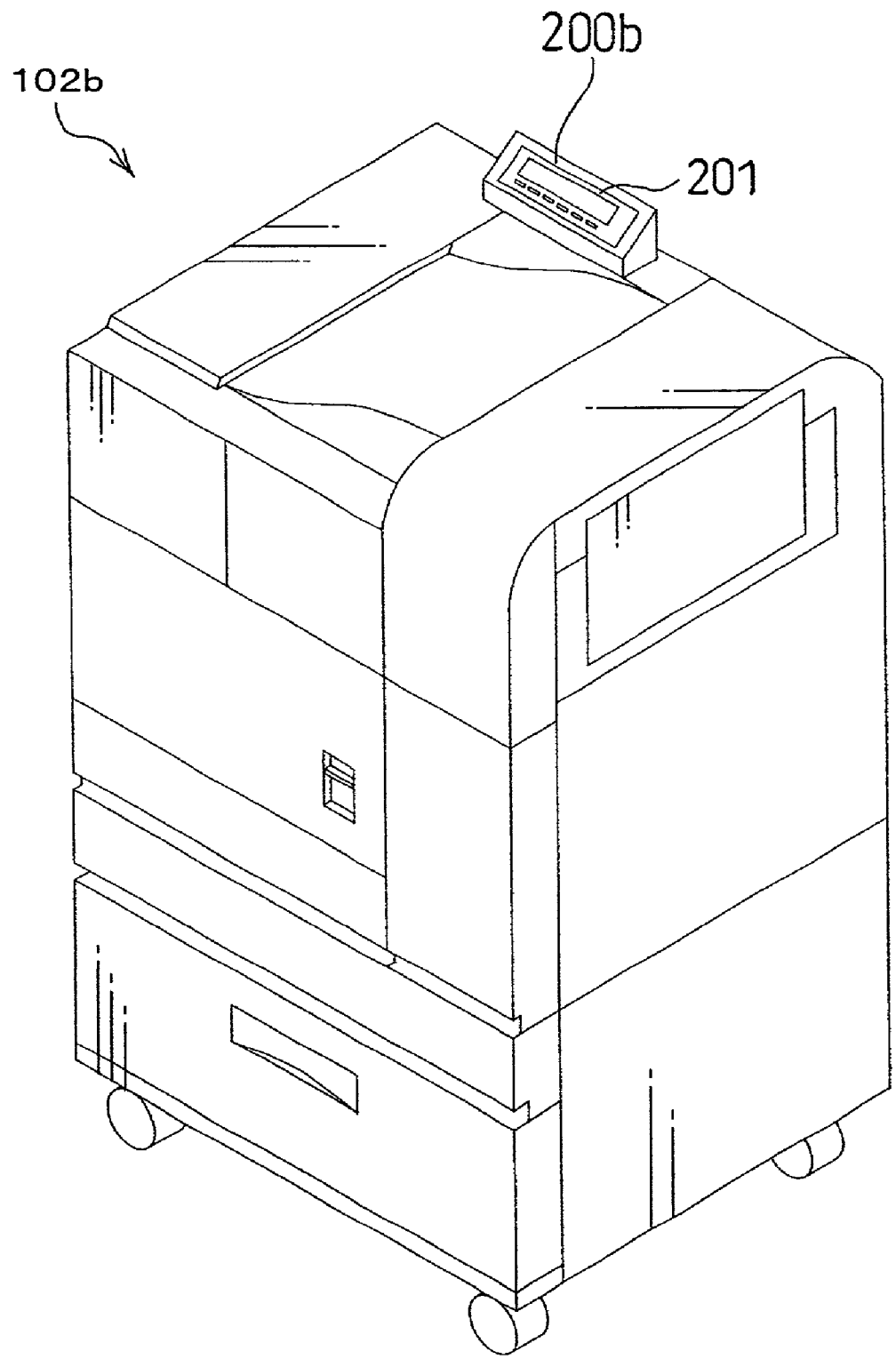
FIG. 30 is a perspective view of a printer unit of still another image forming apparatus in accordance with the second embodiment of the present invention.
Figure 31:
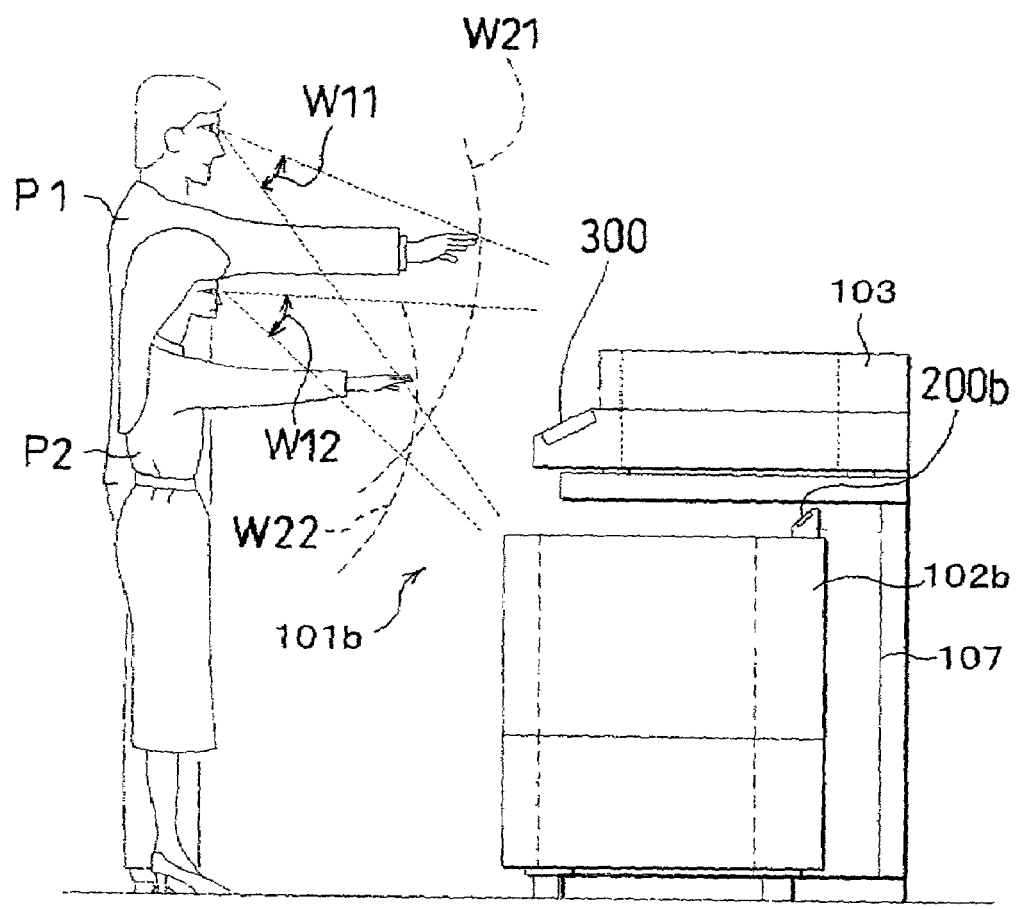
FIG. 31 is a side view of the image forming apparatus adopting the printer unit of FIG. 30.

The following will explain still another embodiment of the present invention with reference to FIG. 30 and FIG. 31.

FIG. 30 is a perspective view of an image forming a printer unit 102b which constitutes an image forming apparatus of the present embodiment. FIG. 31 is a side view of the image forming apparatus 101b adopting the printer unit 102b. For ease of explanation, members having the same functions as those shown in the drawings pertaining to the above-discussed image forming apparatus 101 or 101a will be given the same reference symbols, and explanation thereof will be omitted here. The image forming apparatus 101b of the present embodiment is characterized in that an operation panel 200b (FIGS. 30 and 31) of the printer unit 102b is provided on the upper surface on the back surface side of the printer unit 102b, while an operation panel 300 (FIG. 31) of the scanner unit 103 is provided on the front surface side of the scanner unit 103.

According to the foregoing structure, as illustrated in FIG. 30, in the independent use of the printer device 102b, there is no object above the operation panel 200b of the printer unit 102b, and the operation panel 200b is therefore situated within visible regions W11 and W12 of users P1 and P2" as illustrated in FIG. 31, and is also situated in operable regions W21 and W22. Therefore, the users P1 and P2 can see the display section 201 of the printer unit 102b, and an input operation is therefore permitted.

In contrast, in the combined use of the printer unit 102b and the scanner unit 103, as illustrated in FIG. 31, the scanner unit 103 is positioned above the printer unit 102b, and the users P1 and P2 therefore cannot see the display section 201 of the printer unit 102b, and the input operation is therefore not permitted. As described, according to the foregoing structure of the present embodiment, it is possible to structurally switch the state of the display section 201 between the visible state and the invisible state.

In the foregoing example, the information required for displaying the detailed information on the printer unit 102 using the display section 301 of the scanner unit 103 is stored within the printer controller 202 of the printer unit 102b; however, it may be arranged so as to add the necessary information for displaying the above information using the display section 301 of the scanner unit 103 in the printer unit 102b when combining the printer unit 102b and the scanner unit 103.

As described, the image forming apparatus (image processing apparatus) of the present invention is arranged so as to include:

an independently operable scanner unit equipped with a display section and a display control section, and an independently operable printer unit equipped with a display section and a display control section, wherein the scanner unit and the printer unit are provided as separate members; and the display control sections of the scanner unit and the printer unit cooperatively control the display sections of the scanner unit and the printer unit such that:

in an independent use of the printer unit, the display section of the printer unit is set to be effective, and in a combined use of the printer unit and the scanner unit, the display section of the printer unit is set to be effective if a predetermined condition is satisfied, and if not, only the display section of the scanner unit is set to be effective in displaying information regarding the combined use of the printer unit and the scanner unit.

According to the foregoing structure of the image processing apparatus wherein at least the independently operable scanner unit and the independently operable printer unit are combined, which can be functioned, for example, as a copying machine, information required for the setting of the processing by the printer unit such as a number of copies, etc., is displayed on the print data output side, such as a personal computer, etc. On the other hand, the scanner unit is provided with a large size display section capable of displaying graphics, etc., for displaying information required for the setting on reading conditions, or setting receiving end of read data.

Here, in the combined use of the printer unit and the scanner unit as the copying machine, it may be arranged so as to display information regarding the printer unit is also displayed in the display section of the scanner unit. However, when adopting such arrangement without any restricted condition, the following problem may typically occur. That is, the user gets confused in recognizing which of the information displayed in the display section of the scanner unit provided above the printer unit, or the information displayed in the section of the printer unit provided under the scanner unit is to be referred to.

In response, the present invention sets a predetermine condition, such as an occurrence of failure, etc., in the combined use of the printer unit and the scanner unit, as a copying machine, etc., and only the display section of the scanner unit is usually set effective, and the display section of the printer unit is set effective only under the predetermined condition. In this way, the user needs to see only one of the display sections, which is set effective, and the problem of vexatious complication in checking both of the display sections can be eliminated. As a result, improved operability and convenience can be achieved, and in the meantime, the effect of reducing power consumption can be expected.

The image forming apparatus of the present invention having the foregoing structure may be arranged so as to further include:

an input section for the display section of the scanner unit and an input section for the display section of the printer unit, wherein the display control section of the scanner unit permits an input operation by the input section of the scanner unit when the display section of the scanner unit is effective; and the display control section of the printer unit permits an input operation by the input section of the printer unit when the display section of the printer unit is effective.

According to the foregoing structure, the display control sections also controls if input operations by the input sections are to be permitted, which are typically provided adjacent to the respective input sections or integrally provided with the display sections as touch panels, etc., according to if the corresponding display sections are effective or not.

According to the foregoing structure, the user only needs to perform input operations by using respective input section provided adjacent to or integrally with the display sections, thereby simplifying the input operation by the user.

The image processing apparatus having the foregoing structure of the present invention may be arranged such that the printer unit includes a shielding member for shielding the display section to be invisible by a user when the display control section controls the display section of the printer unit to be ineffective.

According to the foregoing structure, in the case where no information is displayed, the display section itself is shielded by the shielding member such as a slide shutter, etc., so that the display section is not visible by the user. In this way, the user needs not check the contents of the information displayed in the display section but only needs to see the display section itself of the scanner unit, and it is therefore possible offer a better solution to the problem of vexatious complication.

The image processing apparatus having the foregoing structure of the present invention may be arranged such that the predetermined condition is that information to be displayed in the printer unit is different from the information regarding the combined use of the printer unit and the scanner unit.

According to the foregoing arrangement, in the combined use of the printer unit and the scanner unit, information other than the information regarding the combined use of the printer unit and the scanner unit are displayed in the display section of the printer unit, such as date/time, characters in amusement use, etc. It is therefore possible to provide other information to the user while eliminating the complicated process of confirming the display, etc.

The image processing apparatus having the foregoing structure of the present invention may be arranged such that:

the predetermined condition is that a failure has occurred in the scanner unit, and the display control section of the printer unit controls the display section of the printer unit to display a state of the scanner unit.

According to the foregoing structure, in consideration of such possibility that the large-size display section may not be functioned properly, the display section of the printer unit is used to display the state of the scanner unit. It is therefore possible to promptly inform the user of the occurrence of the failure and to reduce the downtime of the apparatus due to the failure.

The image processing apparatus having the foregoing structure of the present invention may be arranged such that:

the display control section of the printer unit controls the display section of the printer unit to display the state of the scanner unit and the state of the printer unit alternately.

According to the foregoing structure, in response to the failure occurred in the scanner section, the state of the failure is displayed in the display section of the printer unit in such a manner that a display indicative of the state of the scanner unit and a display indicative of the state of the printer unit appear alternately. In this way, the user can be indicated not only the state of the failure in the scanner unit but also the state of the print processing of the printer unit.

The image processing apparatus having the foregoing structure of the present invention may be arranged such that:

the predetermined condition is that some failure has occurred in the scanner unit or in any other unit to be used in combination with the printer unit, and the display control section controls the display section of the printer unit to display a state of the failure occurred in the scanner unit or in any other unit.

According to the foregoing structure, the state of failure not only in the scanner unit but also in the feed unit and discharge unit or other optional unit is displayed if occurred. When adopting such display structure wherein a failure indicative display appears only when the corresponding function is selected, and such display does not appear in the normal state, due to a possible delay in informing the user of the occurrence of failure, it takes time to be recovered from the failure. However, according to the foregoing structure of the present invention, as other display section than the large size display section which is used under normal condition, the message indicative of the occurrence of failure is displayed in the display section of the printer unit to call for the user's attention. In this way, it is possible to promptly inform the user of an occurrence of the failure and reduce the downtime caused by the failure.

The image forming apparatus of the present invention may be arranged such that:

the predetermined condition is that an input operation is performed by the input section of the printer unit, and the display control section of the printer unit controls the display section of the printer unit to display information regarding the printer unit.

According to the foregoing structure, upon operating the printer unit, the user tries to obtain the information regarding the printer unit, and thus by displaying the state of the printer unit, an interface which is easy to recognize can be realized.

The image forming apparatus of the present invention may be arranged so as to include:

an independently operable scanner unit equipped with a display section;

an independently operable printer unit equipped with a display section, wherein the scanner unit and the printer unit are provided as separate members, the display section of the scanner unit is a large size display unit capable of displaying graphics, the display section being provided on a front surface side of the scanner unit;

the display section of the printer unit is provided on an upper surface on a back surface side of the printer unit; and in a combined use of the printer unit and the scanner unit, the scanner unit is provided above the printer unit, and the display section of the printer unit is invisible to a user.

According to the foregoing structure, in an independent use of the printer unit, there is no object above the display section of the printer unit, and the display section of the printer unit is therefore within a visible range of the user. On the other hand, in a combined use of the printer unit and the scanner unit, the scanner unit is provided above the printer unit, and the display section of the user therefore becomes invisible to the user.

According to the foregoing structure, the state of the display section of the printer unit can be structurally switched between the visible state in which the display section is visible by the user and the state in which the display section is invisible to the user. As a result, the problem of vexatious complication can be eliminated, and an improved operability and convenience can be achieved.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations, provided such variations do not depart from the spirit of the present invention or exceed the scope of the patent claims set forth below.

What is claimed is:

1. An image processing apparatus, comprising:
   an independently operable scanner unit equipped with a display section and a display control section;
   an independently operable printer unit equipped with a display section and a display control section,
   wherein said scanner unit and said printer unit are provided as separate members; and
   said display control sections of said scanner unit and said printer unit cooperatively control said display sections of said scanner unit and said printer unit such that:
   in an independent use of said printer unit, said display section of said printer unit is set to be effective, and
   in a combined use of said printer unit and said scanner unit, said display section of said printer unit is set to be effective if a predetermined condition is satisfied, and if not, only said display section of said scanner unit is set to be effective in displaying information regarding the combined use of said printer unit and said scanner unit,
   said predetermined condition is that information displayed on said printer unit is different from information regarding the combined use of said printer unit and said scanner unit.

2. The image processing device as set forth in claim 1, wherein:
   said display section of said scanner unit is a large size display unit capable of displaying graphics.

3. The image processing apparatus as set forth in claim 1, wherein:
   said printer unit includes a shielding member for shielding said display section to be invisible by a user when said display control section controls said display section of said printer unit to be ineffective.

4. The image processing apparatus as set forth in claim 1, further comprising:
   an input section for said display section of said scanner unit and an input section for said display section of said printer unit,
   wherein said display control section of said scanner unit permits an input operation by said input section of said scanner unit when said display section of said scanner unit is effective; and
   said display control section of said printer unit permits an input operation by said input section of said printer unit when said display section of said printer unit is effective.

5. The image processing apparatus as set forth in claim 4, wherein:
   said display section of said printer unit is set to be effective in another predetermined condition,
   said another predetermined condition is that an input operation is performed by said input section of said printer unit, and said display control section of said printer unit controls said display section of said printer unit to display information regarding said printer unit.

6. An image processing apparatus, comprising:
   an image processing section for carrying out a processing of image data; and
   a plurality of user interface sections for displaying information regarding said processing of image data and for entering inputs on said processing of image data,
   wherein said plurality of user interface sections are arranged such that in response to an operation input entered by a specific user interface section, other user interface section(s) than said specific user interface section change(s) its (their) input acceptance state(s), so as to display contents corresponding to the operation input on said other user interface section(s) than said specific user interface section.

7. The image processing apparatus as set forth in claim 6, wherein:
   said plurality of user interface sections are arranged such that input acceptance of said other user interface section(s) than the specific user interface section is validated in response to the operation input entered by said specific user interface section.

8. The image processing apparatus as set forth in claim 6, wherein:
   said plurality of user interface sections are arranged such that in response to the operation input entered by said specific user interface section, input acceptance of said other user interface section(s) than the specific user interface section is validated and input acceptance of the specific user interface section is invalidated.

9. The image processing apparatus as set forth in claim 7, wherein:
   said plurality of user interface sections are arranged such that in response to the operation input entered by said specific user interface section, an input entering right allowing for acceptance of the operation input is transferred from the specific user interface section to said other user interface section(s) than the specific user interface section.

10. The image processing apparatus as set forth in claim 9, wherein:
    said plurality of user interface sections are arranged such that in response to operation input(s) entered by said other user interface section(s) than the specific user interface section, the input entering right is transferred back to the specific user interface section.

11. The image processing apparatus as set forth in any one of claims 7 through 10, wherein:
    said plurality of user interface sections are arranged such that while changing the input acceptance state(s) of said other user interface section(s) than the specific user interface section, a display state of at least one user interface section is changed.

12. An image processing apparatus, comprising:
    a first image processing section, for carrying out a processing of image data, including a first display section;
    at least one second image processing section, for carrying out a processing of image data, including at least one second display section; and
    a plurality of user interface sections corresponding to the first display section and the at least one second display section for entering commands on said processing of image data,
    wherein (a) in a normal state, a user interface section corresponding to the first display section is non-effective while the user interface section corresponding to the at least one second display section is effective, and (b) when the normal state switches to a specific processing set state in response to entering a command to the user interface section corresponding to the second display section, the user interface section corresponding to the first display section is made effective, so that contents corresponding to the command is displayed on the first display section, the command being to select a specific processing.

13. An image processing apparatus, comprising:
    a printer unit equipped with a user interface section having a first display section; and a scanner unit equipped with a user interface section having a second display section;

wherein when one of the user interface section of the printer unit and the user interface section of the scanner unit is a first interface section and the other of them is a second interface section, (a) in a normal state, the first user interface section is non-effective while the second user interface section is effective, and (b) when the normal state switches to a specific processing set state in response to entering a command to the second user interface section, the first user interface section is made effective, so that information regarding the specific processing is displayed on the first user interface section, the command being to select a specific processing.

14. The image processing apparatus as set forth in claim 13, wherein:

when in said normal state, said first user interface section is in a non-display state and said second user interface section is in a display state; and when in said specific processing set state, said first user interface section and said second user interface section are both in the display state.

15. The image processing apparatus as set forth in claim 14, wherein:

when in said normal state, information regarding said printer unit and scanning unit is displayed on said second user interface section.

16. The image processing apparatus as set forth in claim 13, wherein:

when in said specific processing set state, said first user interface section is used to enter commands regarding said specific processing.

17. The image processing apparatus as set forth in claim 13, wherein:

when in said normal state, said second user interface section is used to enter a command to said printer unit and enter a command to said scanner unit.

18. The image processing unit as set forth in claim 13, wherein:

said first user interface section is the user interface section of the printer unit, and said second user interface section is the user interface section of the scanner unit.

19. An image processing apparatus comprising:

an independently operable scanner unit equipped with a display section and a display control section;

an independently operable printer unit equipped with a display section and a display control section, wherein said scanner unit and said printer unit are provided as separate members; and said display control sections of said scanner unit and said printer unit cooperatively control said display sections of said scanner unit and said printer unit such that:

in an independent use of said printer unit, said display section of said printer unit is set to be effective, and in a combined use of said printer unit and said scanner unit, said display section of said printer unit is set to be effective if a predetermined condition is satisfied, and if not, only said display section of said scanner unit is set to be effective in displaying information regarding the combined use of said printer unit and said scanner unit, said predetermined condition is that a failure has occurred in said scanner unit, and said display control section of said printer unit controls said display section of said printer unit to display a state of said scanner unit.

20. The image processing apparatus as set forth in claim 19, wherein:

said display control section of said printer unit controls said display section of said printer unit to display the state of said scanner unit and the state of said printer unit alternately.

21. An image processing apparatus comprising:

an independently operable scanner unit equipped with a display section and a display control section;

an independently operable printer unit equipped with a display section and a display control section, wherein said scanner unit and said printer unit are provided as separate members; and said display control sections of said scanner unit and said printer unit cooperatively control said display sections of said scanner unit and said printer unit such that:

in an independent use of said printer unit, said display section of said printer unit is set to be effective, and in a combined use of said printer unit and said scanner unit, said display section of said printer unit is set to be effective if a predetermined condition is satisfied, and if not, only said display section of said scanner unit is set to be effective in displaying information regarding the combined use of said printer unit and said scanner unit, said predetermined condition is that some failure has occurred in said scanner unit or in any other unit to be used in combination with said printer unit, and said display control section controls said display section of said printer unit to display a state of the failure occurred in said scanner unit or in any other unit.

* * * * *